US012203427B2

(12) United States Patent
Rabhi

(10) Patent No.: US 12,203,427 B2
(45) Date of Patent: Jan. 21, 2025

(54) MULTI-TEMPERATURE DOUBLE-ACTING PISTON

(71) Applicant: Vianney Rabhi, Lyons (FR)

(72) Inventor: Vianney Rabhi, Lyons (FR)

( * ) Notice: Subject to any disclaimer, the term of this patent is extended or adjusted under 35 U.S.C. 154(b) by 162 days.

(21) Appl. No.: 18/107,794

(22) Filed: Feb. 9, 2023

(65) Prior Publication Data

US 2023/0258145 A1 Aug. 17, 2023

Related U.S. Application Data

(60) Provisional application No. 63/309,111, filed on Feb. 11, 2022.

(51) Int. Cl.
*F02G 1/044* (2006.01)

(52) U.S. Cl.
CPC ........ *F02G 1/0445* (2013.01); *F02G 2250/03* (2013.01); *F02G 2270/40* (2013.01)

(58) Field of Classification Search
CPC ........ F02G 1/044; F02G 1/0445; F02G 1/053; F02G 1/055; F02G 2270/40; F02F 3/22; F02F 3/225; F16J 1/008; F16J 1/08
See application file for complete search history.

(56) References Cited

U.S. PATENT DOCUMENTS

| | | | | |
|---|---|---|---|---|
| 4,653,269 | A | 3/1987 | Johnson | |
| 9,982,626 | B2 * | 5/2018 | Rabhi | F02G 1/05 |
| 10,415,500 | B2 * | 9/2019 | Rabhi | F02G 1/053 |
| 10,428,954 | B2 * | 10/2019 | Rabhi | F16J 15/406 |
| 10,989,142 | B2 * | 4/2021 | Rabhi | F02G 3/02 |
| 12,000,357 | B2 * | 6/2024 | Rabhi | F02F 3/0015 |

FOREIGN PATENT DOCUMENTS

| | | | |
|---|---|---|---|
| EP | 3 350 433 | B1 | 8/2019 |
| EP | 3 585 993 | B1 | 4/2021 |
| FR | 3 032 252 | B1 | 5/2018 |
| FR | 3 071 869 | B1 | 10/2019 |
| WO | 2016/120560 | A2 | 8/2016 |

* cited by examiner

*Primary Examiner* — Michael Leslie
(74) *Attorney, Agent, or Firm* — NIXON & VANDERHYE

(57) ABSTRACT

The multi-temperature double-acting piston includes a peripheral sealing ring, a lower hot crown and/or an upper hot crown, and moves in translation in a cold cylinder of a heat engine which includes a lower cylinder head and an upper cylinder head, the piston including a central piston pin the lower piston rod of which passes through the lower cylinder head so as to be connected to a power transmission housed in a transmission casing, and the upper piston rod of which passes through the upper cylinder head so as to open out into a piston cooling and lubricating chamber, a lubricating-cooling gallery provided in the pin putting the chamber in communication with the casing via an internal piston volume.

29 Claims, 15 Drawing Sheets

[Fig. 1]
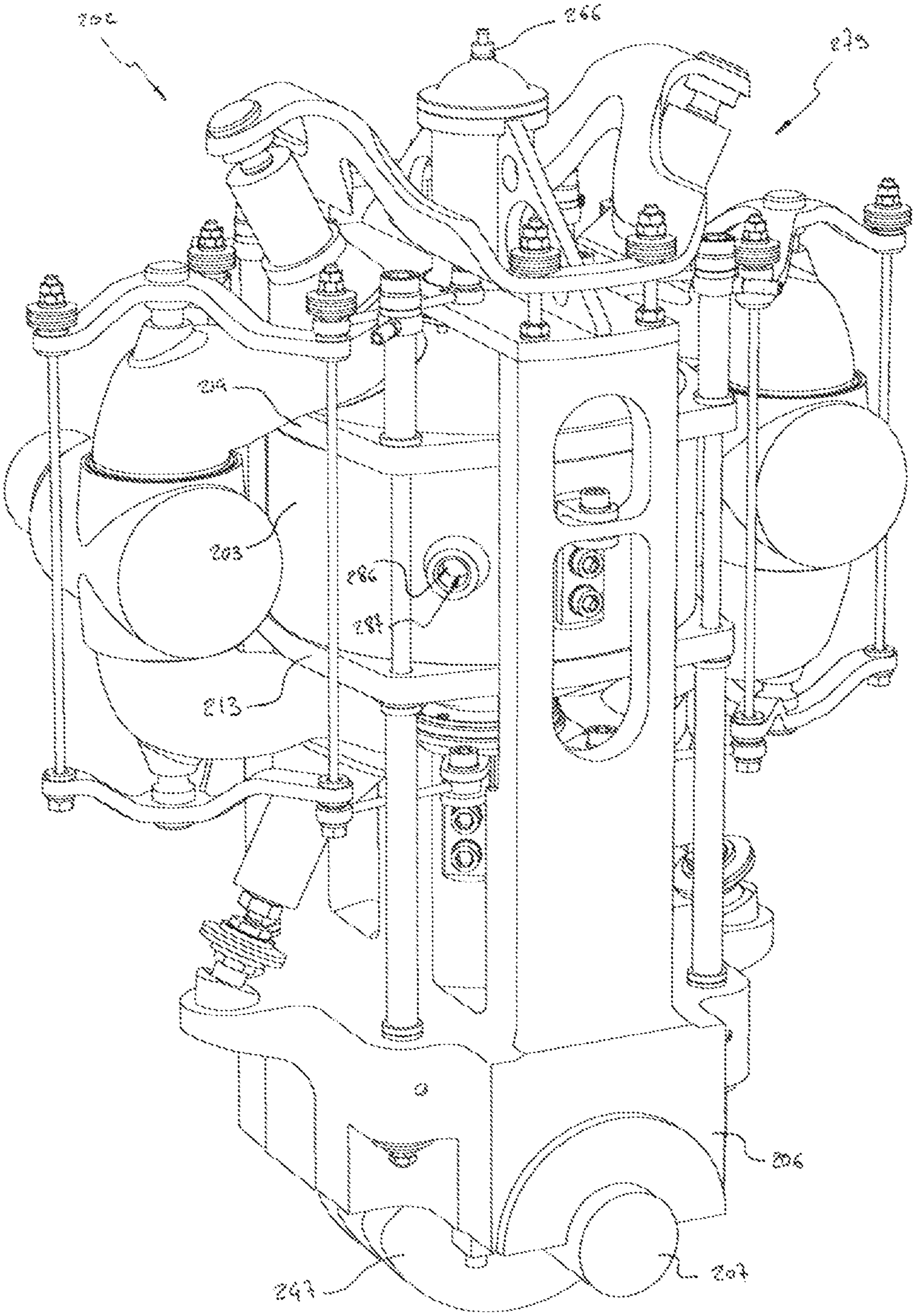

[Fig. 2]
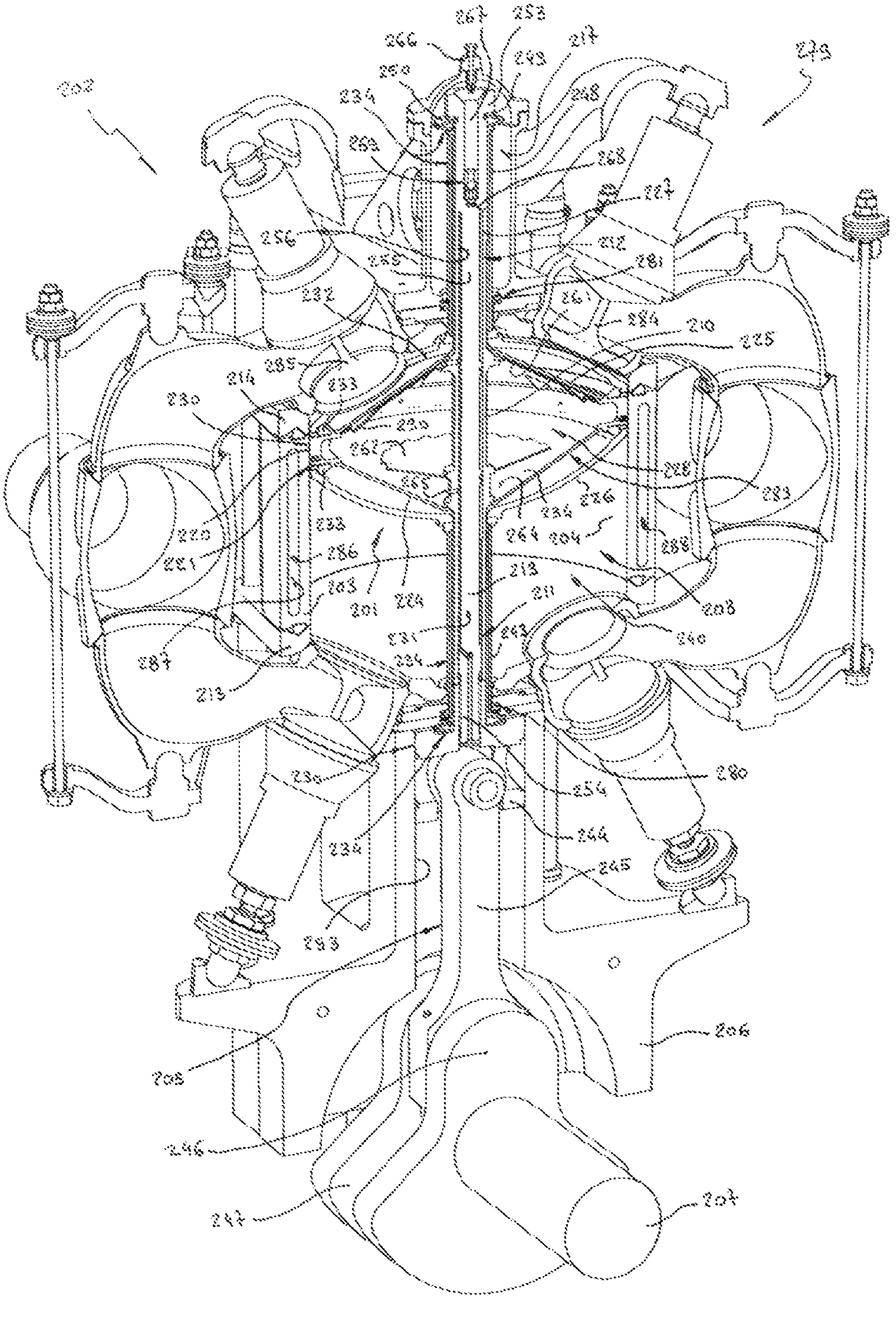

[Fig. 3]
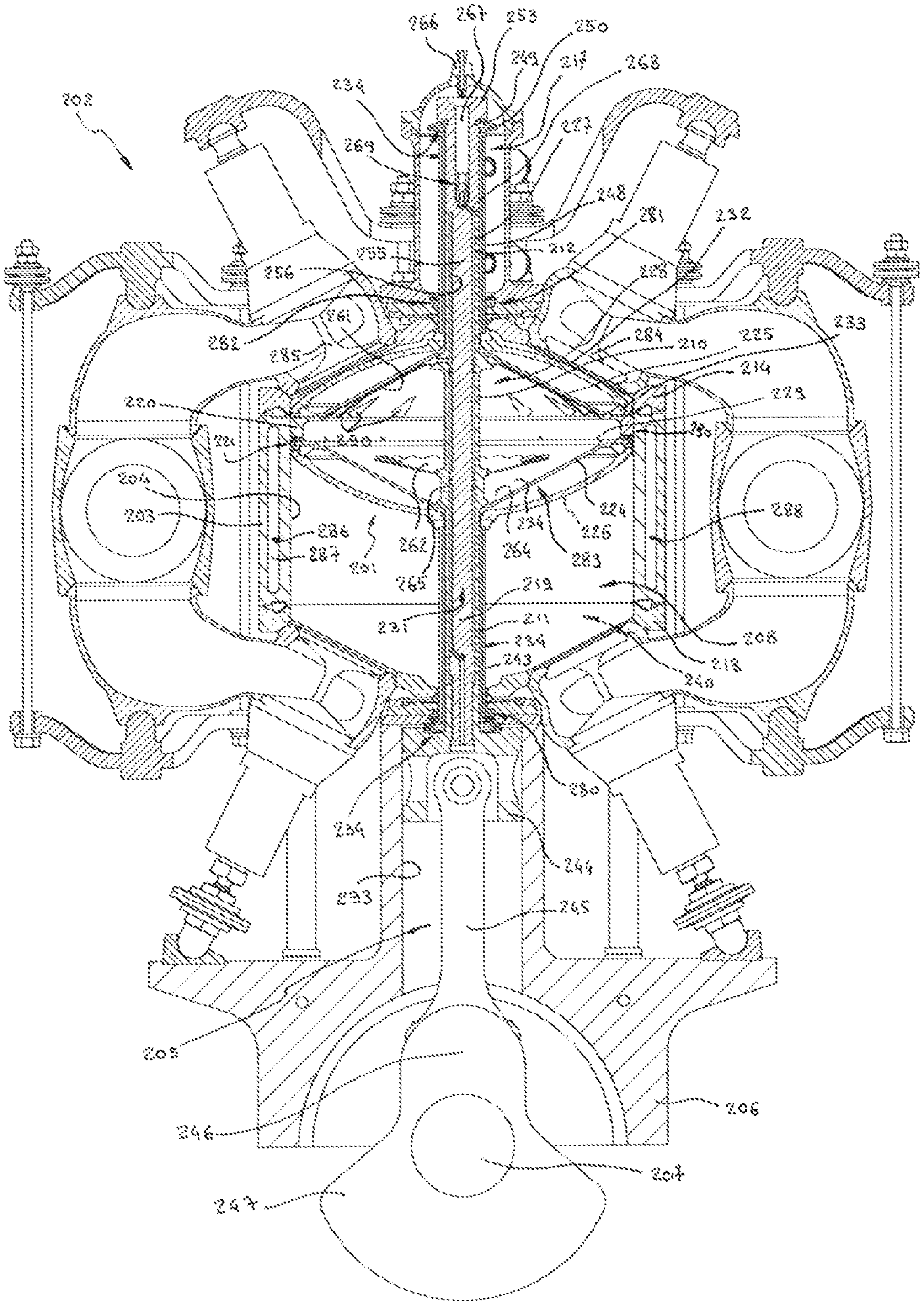

[Fig. 4]
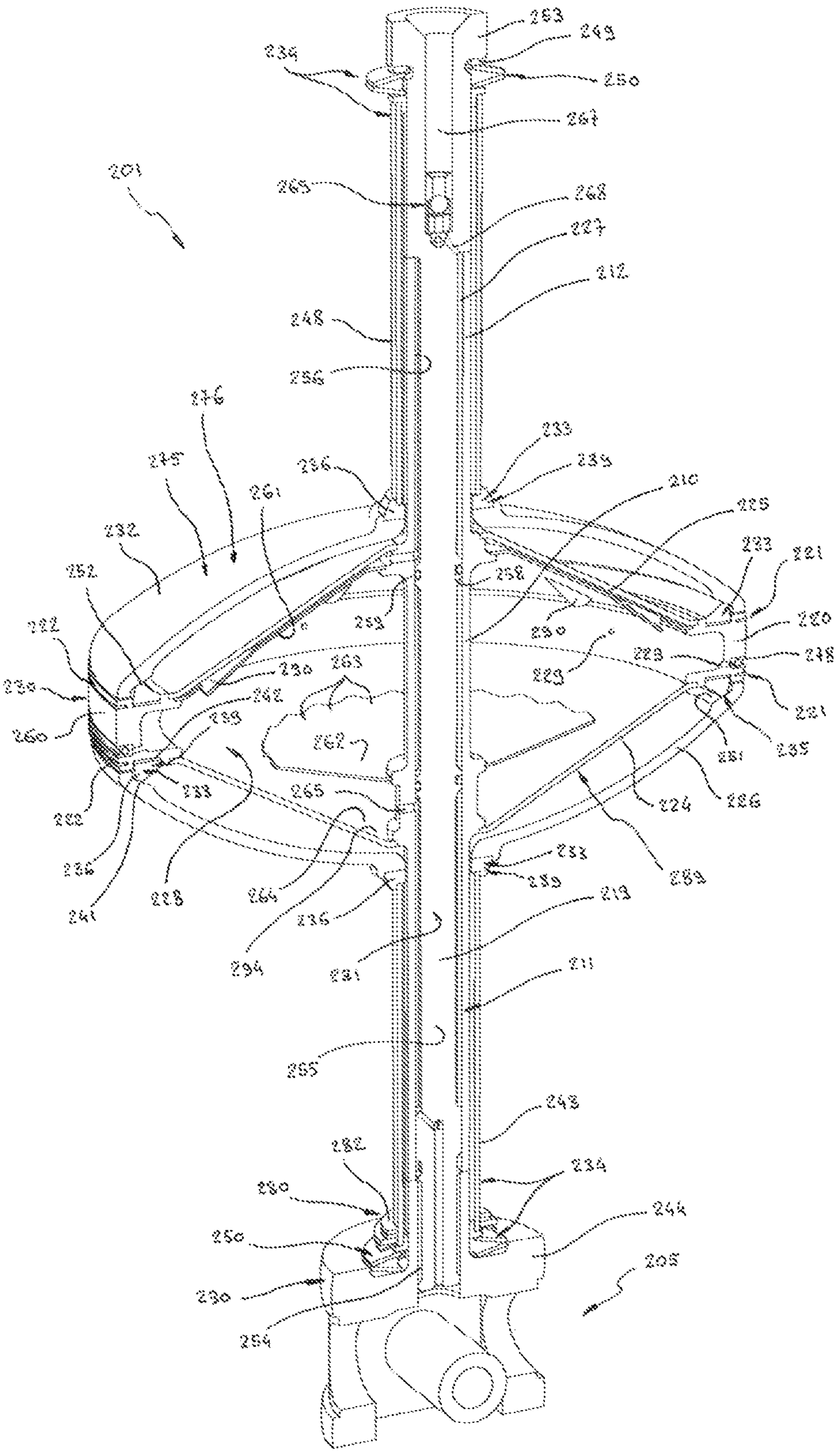

[Fig. 5]
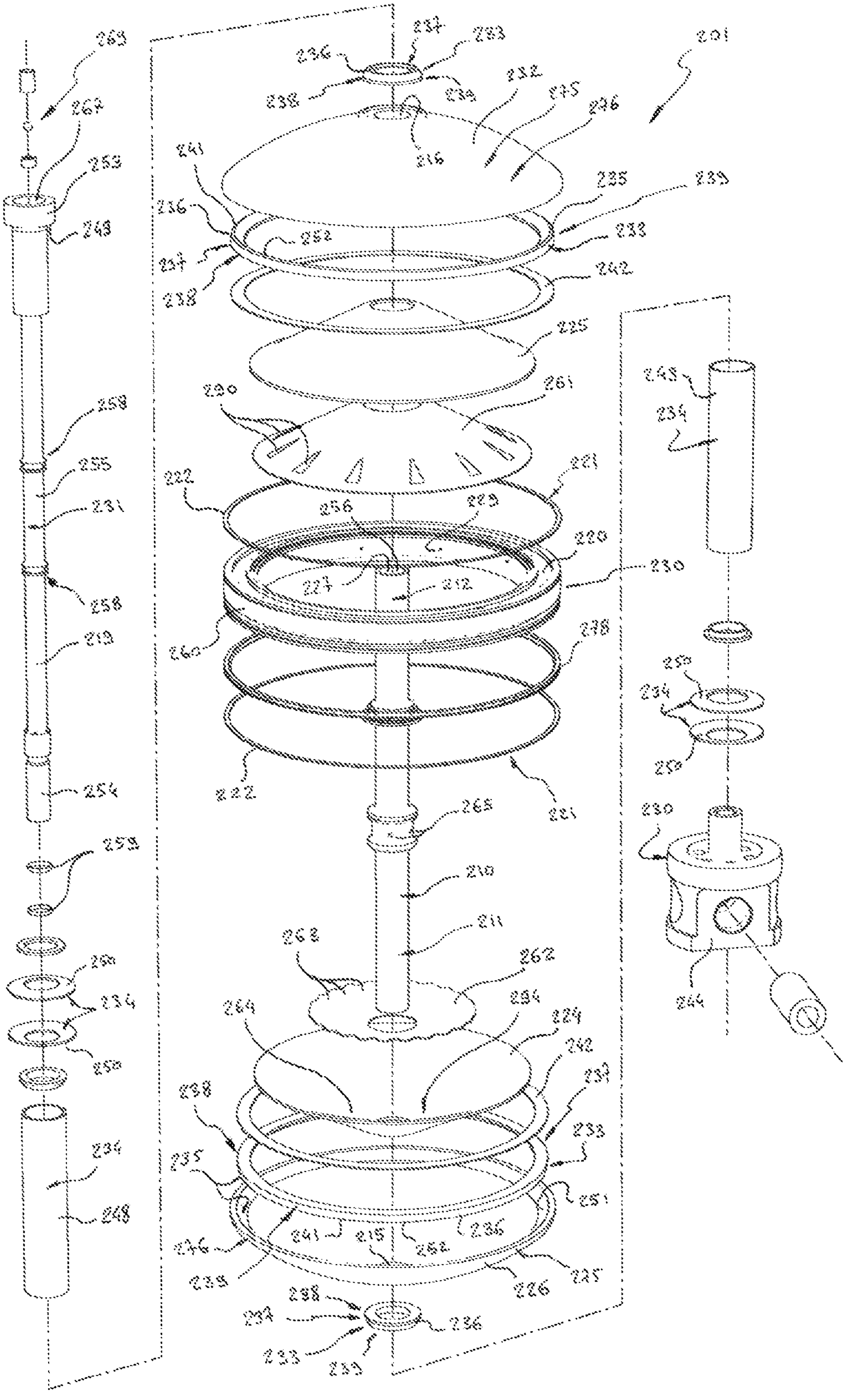

[Fig. 6]
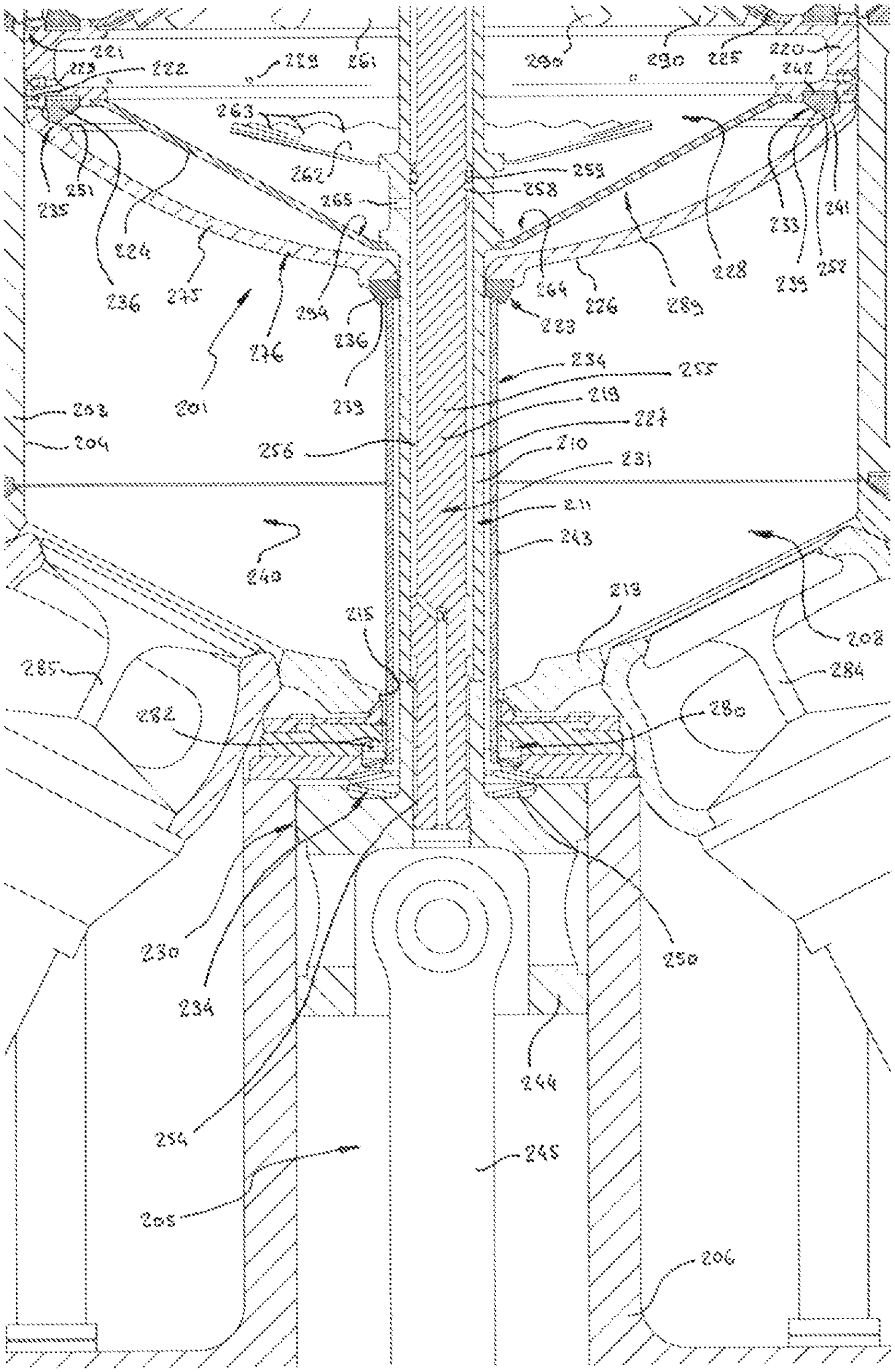

[Fig. 7]
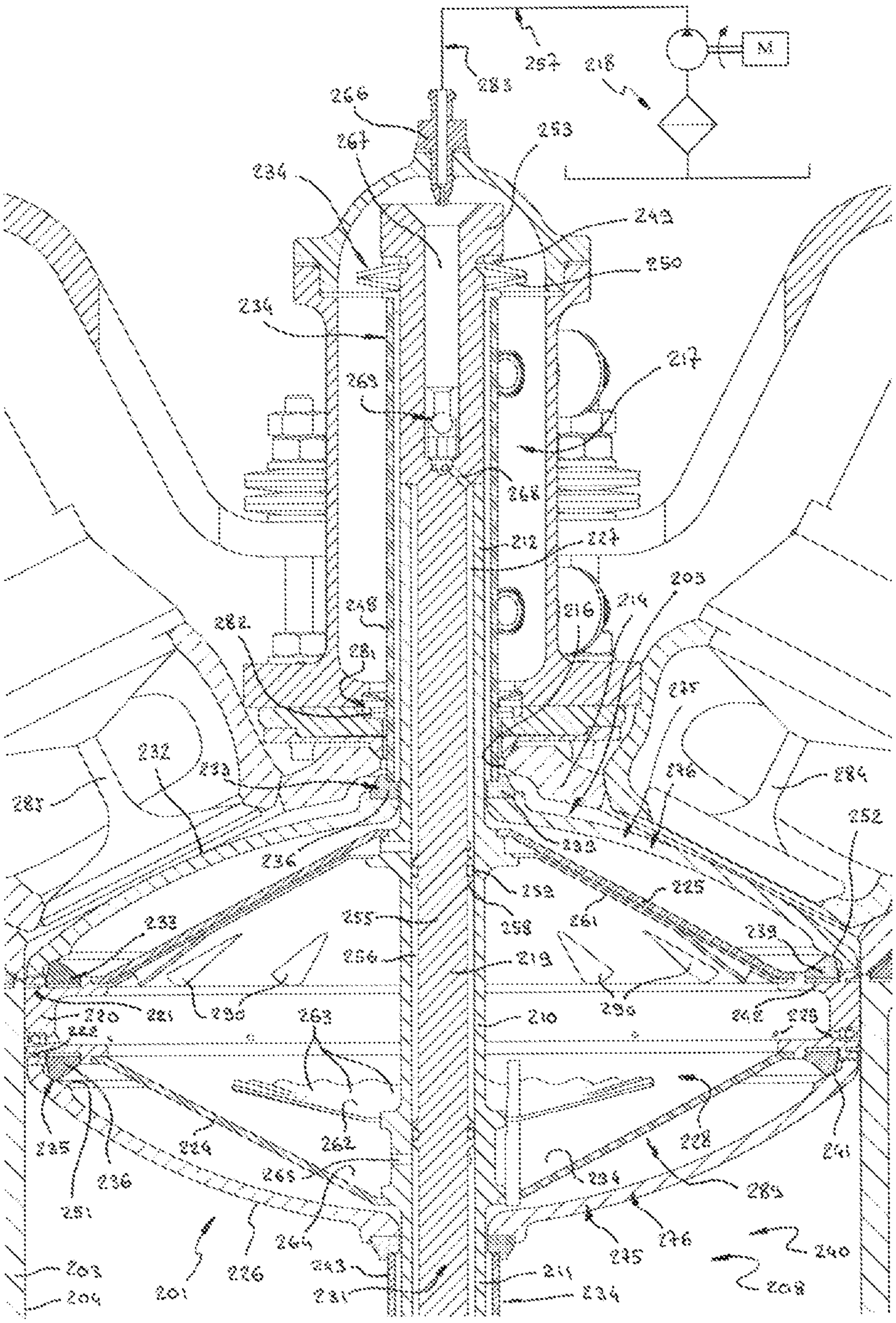

[Fig. 8]
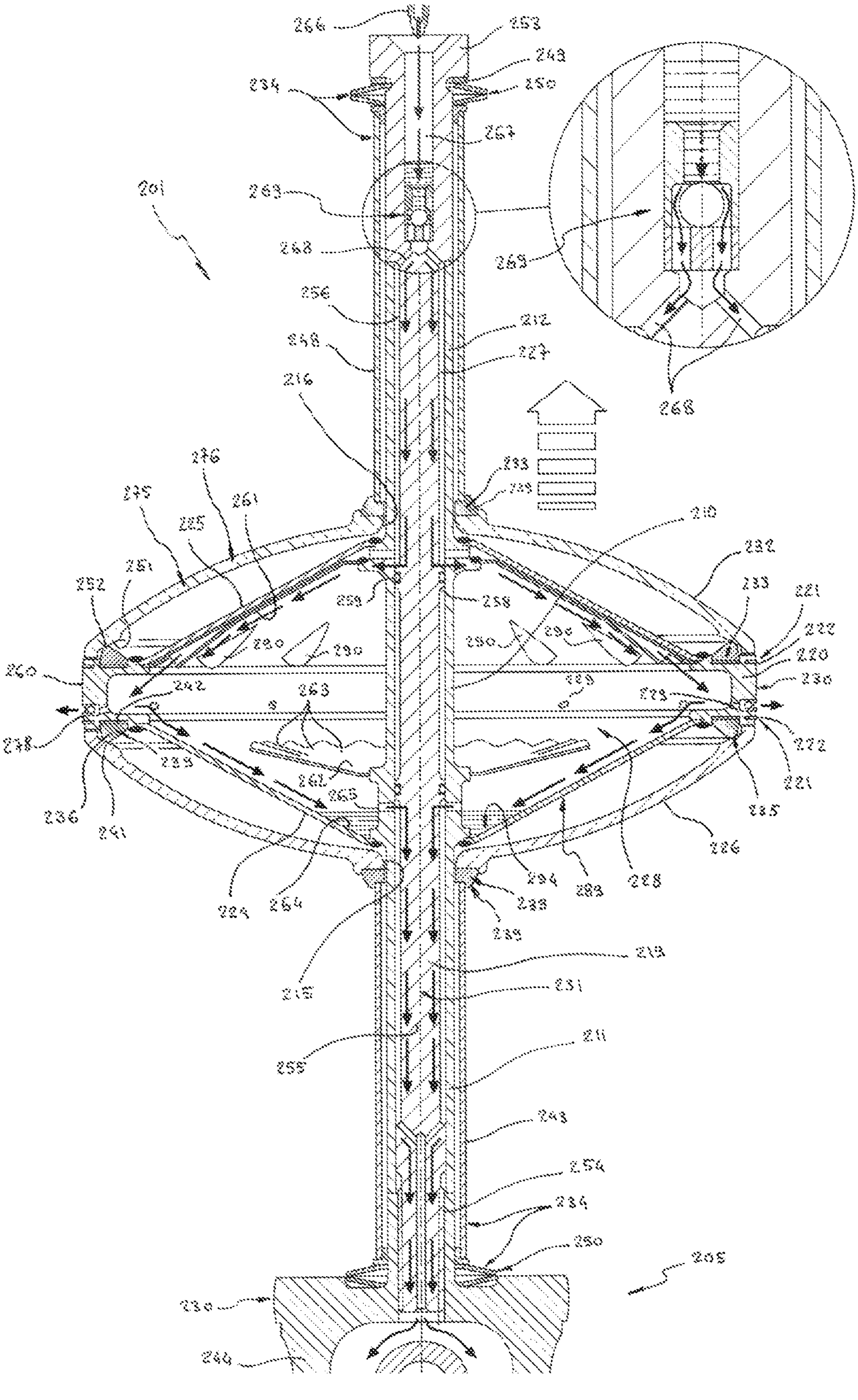

[Fig. 9]
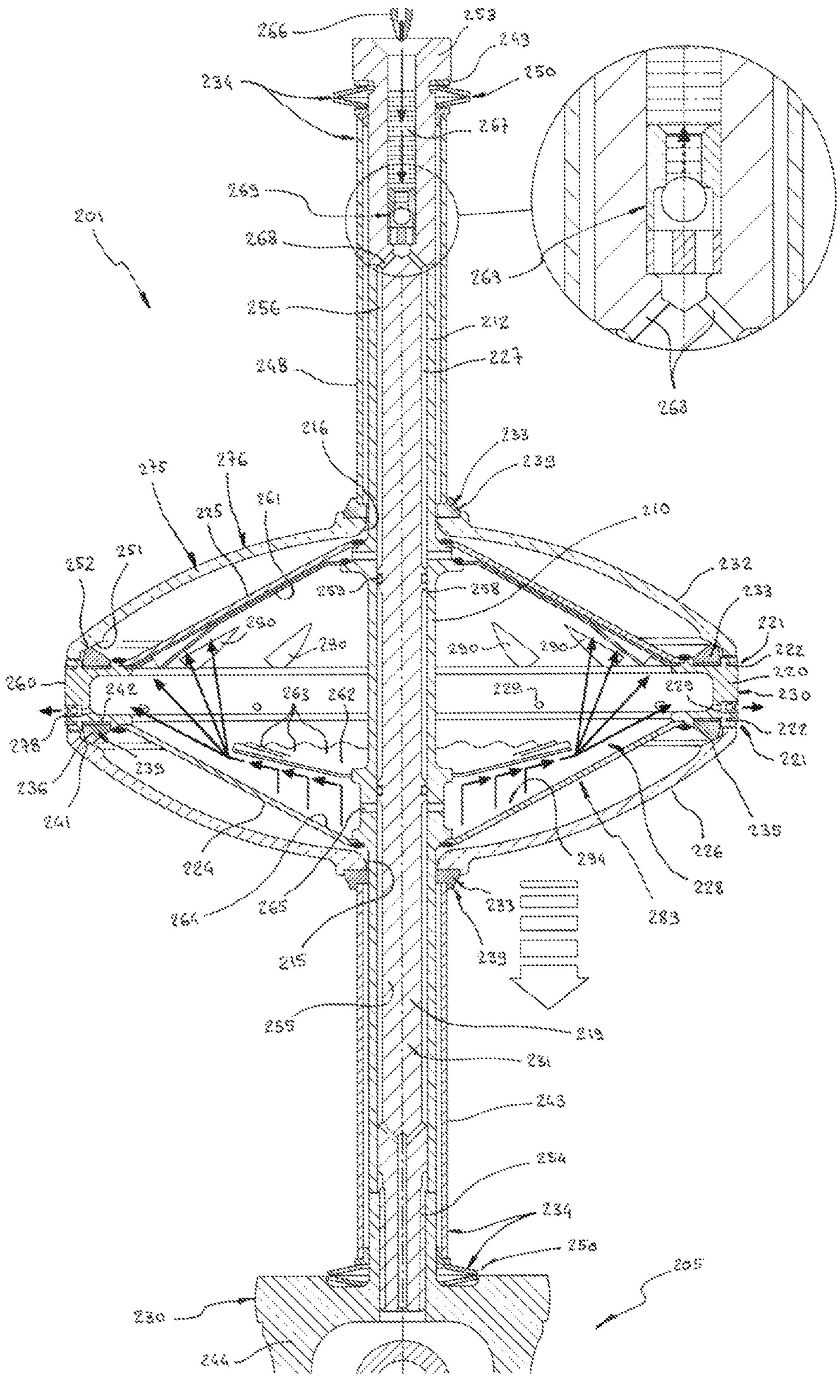

[Fig. 10]
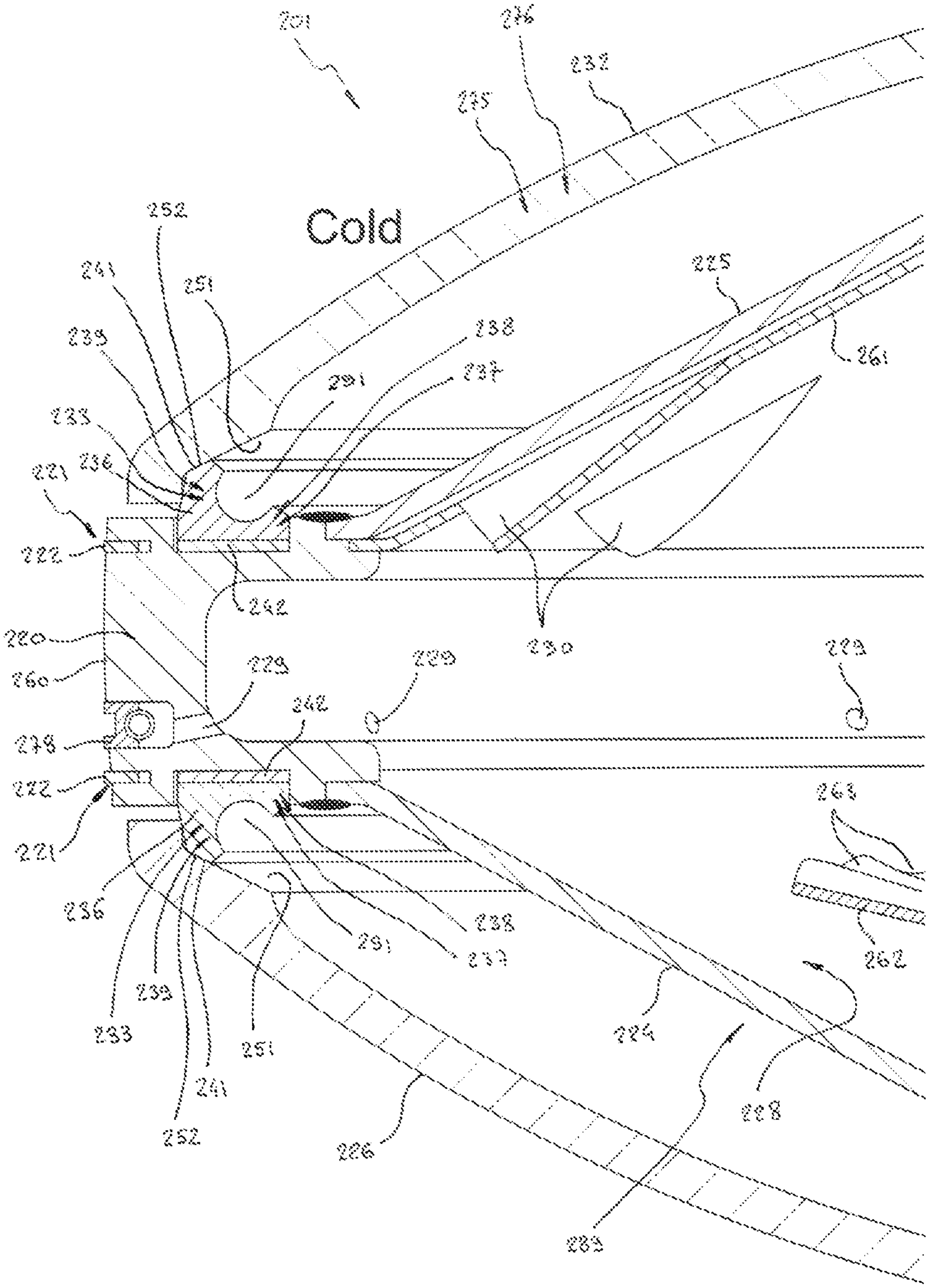

[Fig. 11]
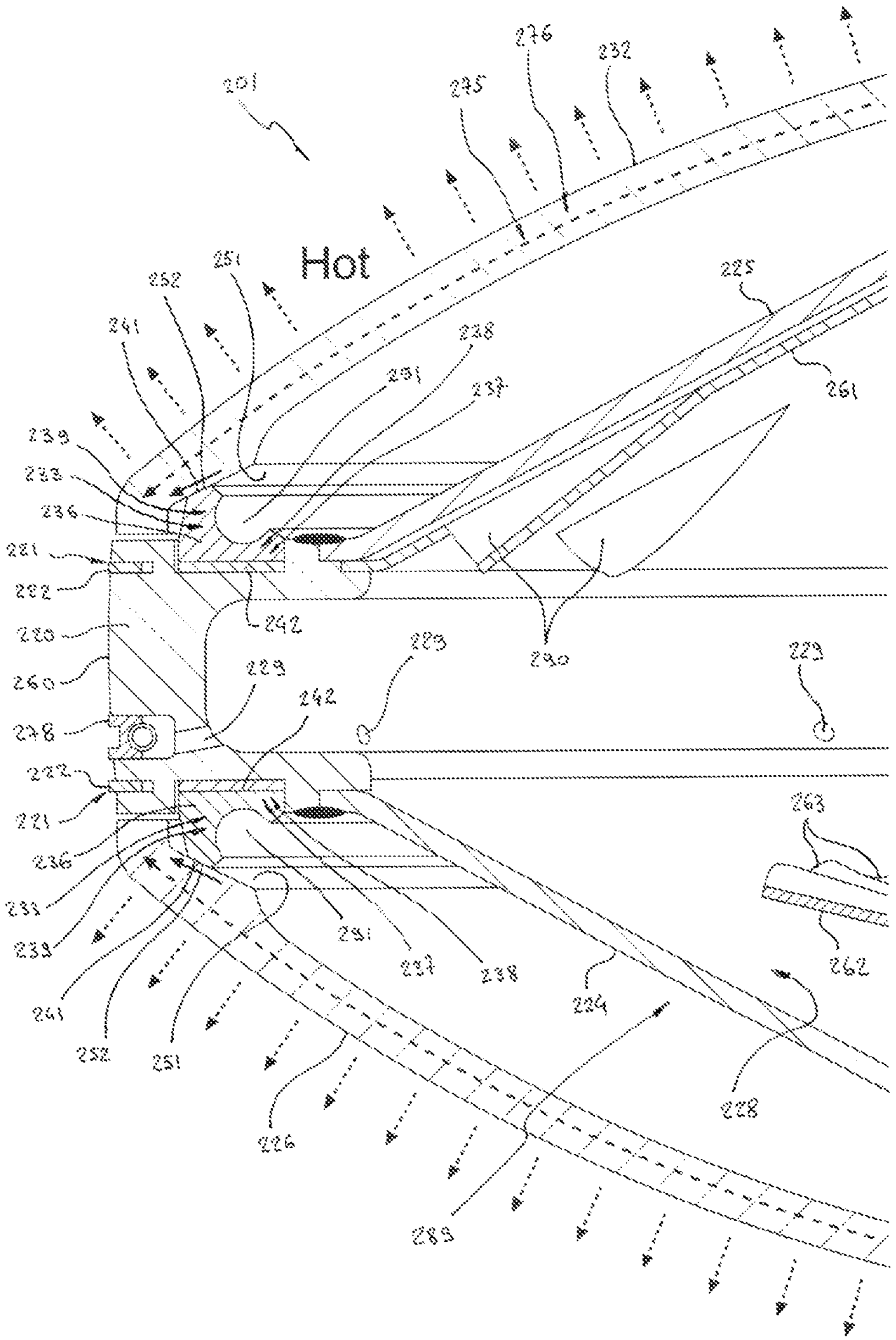

[Fig. 12]
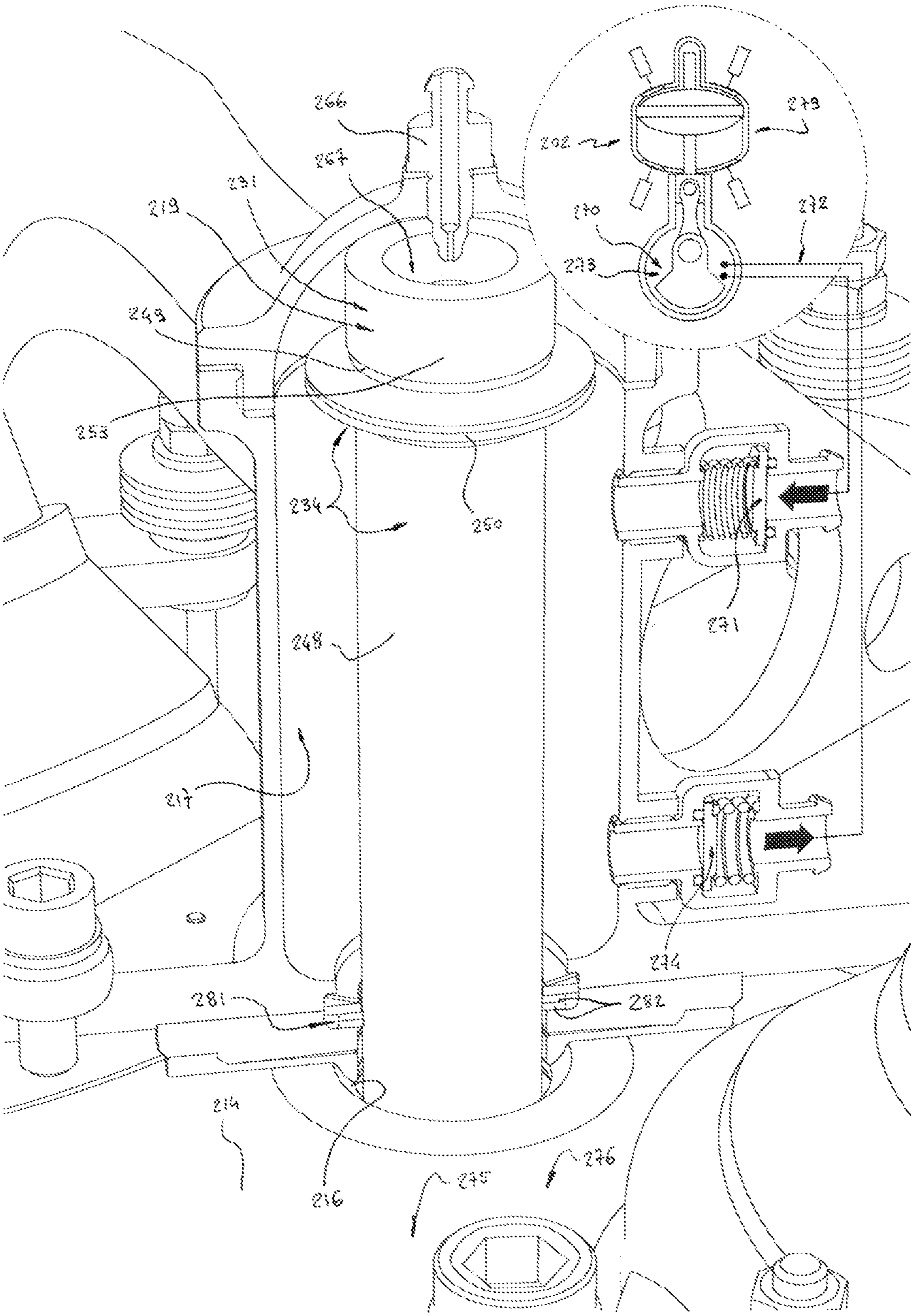

[Fig. 13]
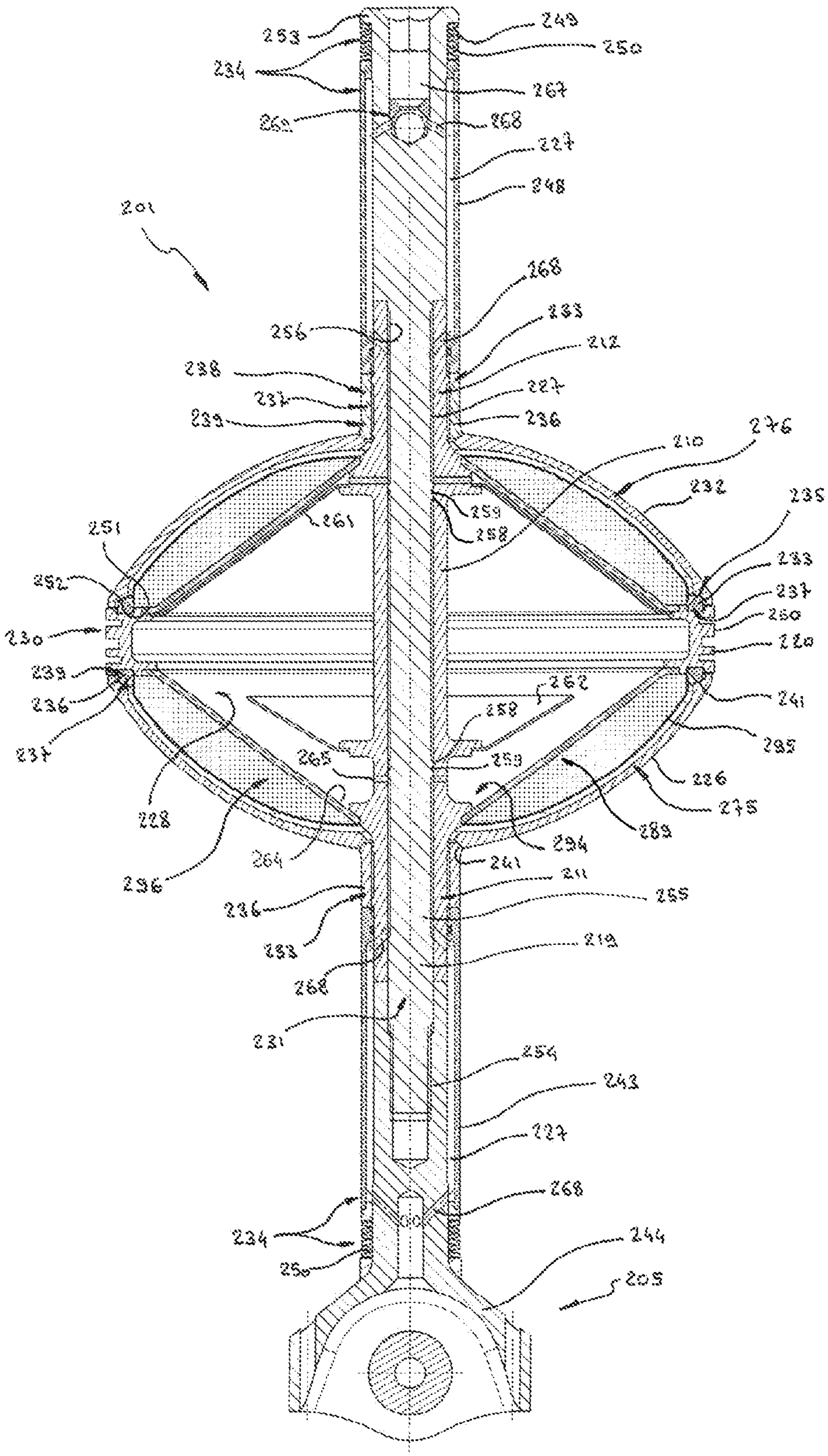

[Fig. 14]
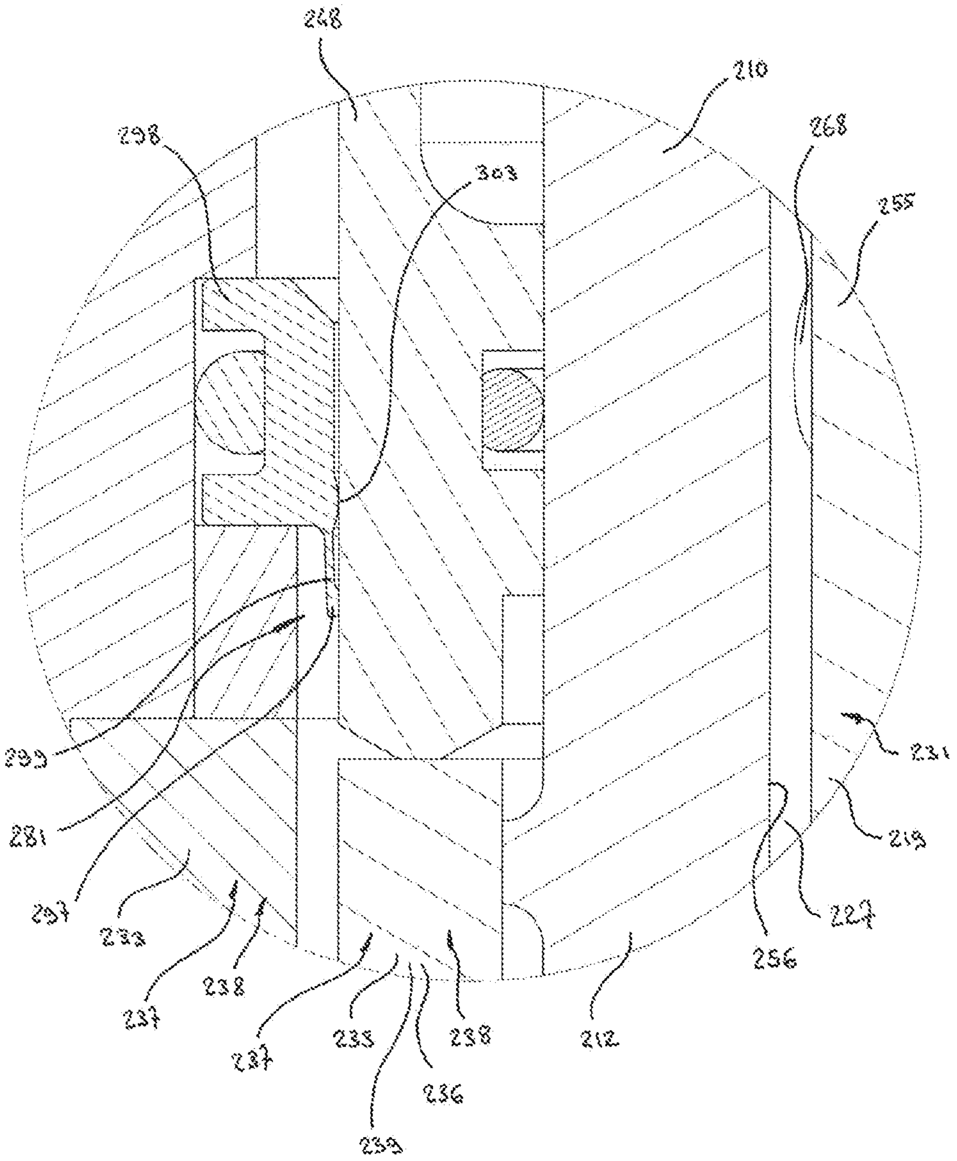

[Fig. 15]
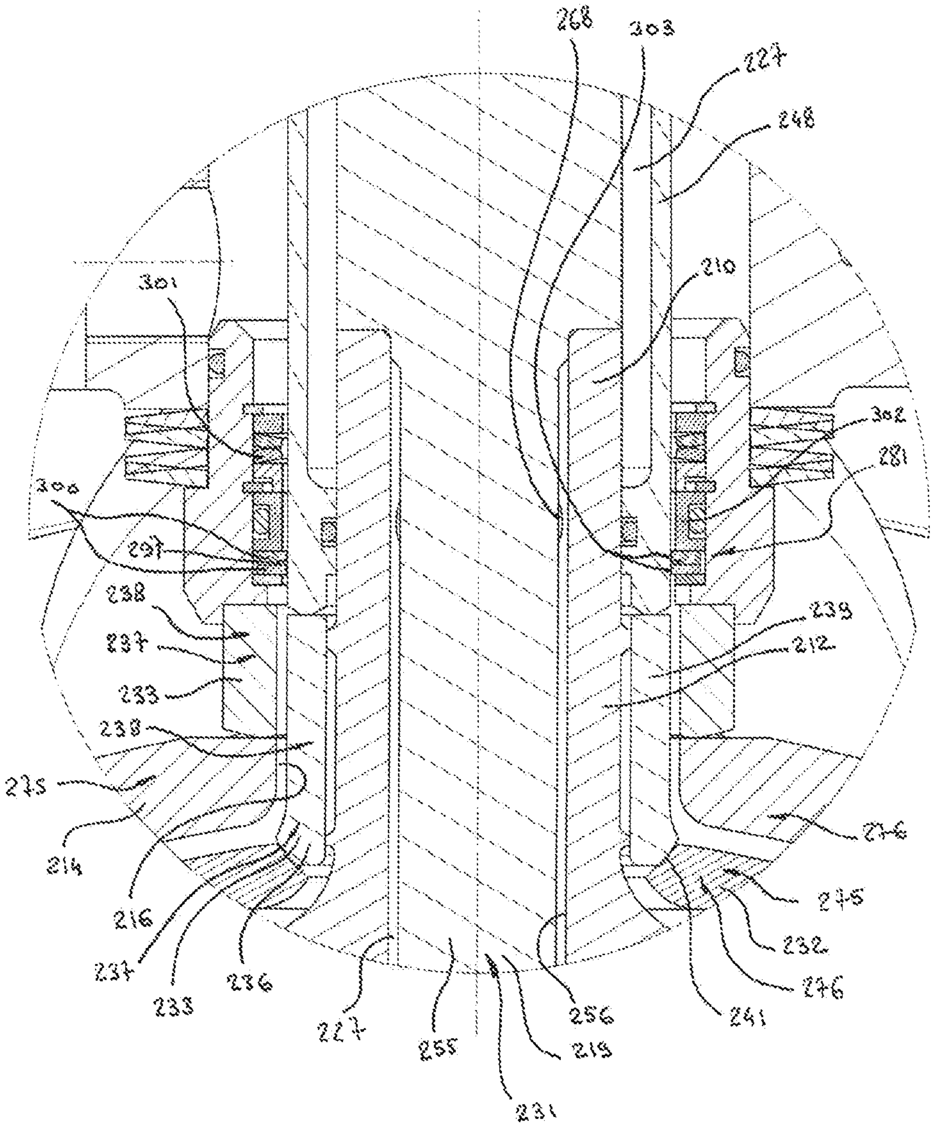

MULTI-TEMPERATURE DOUBLE-ACTING PISTON

BACKGROUND OF THE INVENTION

Field of the Invention

The present invention relates to a multi-temperature double-acting piston, said piston being particularly suited to reciprocating engines implementing the regenerative Brayton thermodynamic cycle with pistons rather than with centrifugal compressors and turbines.

Description of the Related Art

Regenerative Brayton cycle engines generally comprise separate members dedicated to each of the phases of said cycle, said phases taking place continuously and simultaneously in said members, unlike Rochas, Miller, Atkinson, or Diesel Beau cycle reciprocating internal combustion engines, the phases of which are performed successively into one and the same cylinder.

Consequently, regenerative Brayton cycle engines comprise at least one compressor, at least one regenerative exchanger, at least one burner operating continuously or an internal or external hot source, and at least one expansion valve, Allocating each phase of a thermodynamic cycle to a dedicated member has various advantages. In particular, the temperature of the inner walls of each said member can remain very close to that of the gases during said phase.

For example, the temperature of the inner walls of the compressor of a regenerative Brayton cycle engine can be maintained as low as possible, thereby helping to minimize compression work and maximize the total thermodynamic efficiency of said engine.

Conversely, since the inner walls of the expansion valve of said engine are in contact with the hot gases coming from the burner, their temperature must be high and in any case, maintained as close as possible to the average temperature of said gases between the start and the end of their expansion.

Despite these advantages, the maximum thermodynamic efficiency of engines with centrifugal compressors and regenerative Brayton cycle turbines is, in practice, not much higher than that of conventional spark ignition engines, and at most, comparable to that of fast diesel engines.

In any case, said efficiency remains lower than that of two-stroke diesel engines which are slow by several tens of megawatts used, for example, for naval propulsion or stationary electricity production.

Furthermore, engines with centrifugal compressors and regenerative Brayton cycle turbines are not very suitable for low power, and can only operate over a restricted power range outside of which their efficiency drops drastically.

This is why engines with centrifugal compressors and regenerative Brayton cycle turbines are mainly used for applications where efficiency is not the only objective, and which require, for example, high specific and volume power, low acoustic and vibratory emissions, long service life, or reduced maintenance.

This is the case, for example, with certain military vessels fitted, for example, with the "Rolls-Royce WR-21" regenerative Brayton cycle engine with centrifugal compressor and turbines, the efficiency of which hardly exceeds forty percent, while that of the slow two-stroke diesel engines fitted to certain vessels exceeds fifty percent.

This is also the case for certain generators most often operating in cogeneration of electricity and heat, such as the "T100" microturbine from the company "Turbec", or the "C65" microturbine from the company "Capstone", the electrical efficiencies of which are around twenty-eight to thirty percent only, but which require little maintenance, while offering very long service lives.

The advantage of these turboshaft engines is that their turbines can withstand temperatures of about one thousand three hundred degrees Celsius. However, their total thermodynamic efficiency remains limited by that of the centrifugal compressors and the turbines that constitute them, the efficiency of said compressors and said turbines hardly exceeding eighty percent over a relatively narrow operating range.

In view of the above, it would be particularly advantageous to be able to replace the centrifugal compressors and turbines of regenerative Brayton cycle engines by positive-displacement piston machines, the efficiency of which is notoriously higher.

This is, for example, the subject matter of U.S. Pat. No. 4,653,269 of Mar. 31, 1987, where the expansion turbine usually found on regenerative Brayton cycle turboshaft engines is replaced by a piston volumetric expansion cylinder.

However, the calculations demonstrate that if the inner walls of said volumetric expansion valve are cooled and maintained, for example, around one hundred degrees Celsius, as is the case with reciprocating engines produced and commercialized on a large scale, the thermodynamic efficiency of a regenerative Brayton cycle engine cannot exceed that of an automotive diesel engine.

For a regenerated Brayton cycle engine with a volumetric expansion valve to deliver very high thermodynamic efficiencies, it is essential that the inner walls of its expansion valve be maintained at a temperature close to the average temperature of the gases expanded in said expansion valve.

For example, if the hot gases are introduced into the expansion valve at a temperature of one thousand three hundred degrees Celsius and are expelled from said expansion valve at the end of the expansion at a temperature of six hundred degrees Celsius, the inner walls of said expansion valve must be maintained at a temperature of approximately nine hundred and fifty degrees Celsius.

The problem is that at such a temperature, it is impossible to maintain an oil film on the walls of the cylinder of the expansion valve in order to lubricate any sealing segments that an expansion valve piston moving in said cylinder would comprise.

Indeed, from about one hundred and sixty degrees Celsius, the oil film on the cylinder begins to coke, and then burns beyond two hundred and fifty degrees Celsius.

The production of a regenerative Brayton cycle engine with high thermodynamic efficiency therefore faces a double impasse.

Indeed, either said engine consists of centrifugal compressors and turbines resistant to high temperature, but in this case, the modest efficiency of these members does not allow it to exceed a total efficiency equivalent to that of an automotive diesel engine, or it consists of a piston volumetric expansion valve which, in order to be sealed, requires a piston provided with sealing segments sliding on an oil film formed on the surface of a cylinder, the latter needing, to this end, to remain at a temperature not exceeding about one hundred and twenty degrees Celsius, which also does not allow the total efficiency of said engine to be competitive.

In this context, it would be advantageous to be able to combine the ability of turbines to operate at high temperature with that of piston volumetric machines to expand gases at a high efficiency.

It is for this purpose that the heat engine with transfer-expansion and regeneration according to patent WO2016120560 published on Aug. 4, 2016 and belonging to the applicant comprises contactless piston sealing means consisting of an inflatable perforated continuous ring which, when it is subjected to a certain internal pressure, inflates and approaches a few micrometers from the expansion valve cylinder with which it engages without touching said cylinder, while allowing compressed air to leak via calibrated orifices which pass right through it in its radial thickness.

The above-described fluid cushion sealing device is also the subject matter of patent No. FR 3032252 issued on May 25, 2018 and belonging to the applicant. This device makes it possible to provide a contactless sealing and thus to no longer use oil to lubricate a segment operating by contact, and thus to engage with a hot expansion valve cylinder maintained at a temperature of several hundreds of degrees Celsius.

In this context, it therefore actually becomes possible to use a piston volumetric expansion valve to produce a regenerative Brayton cycle engine, and to maximize the efficiency of said engine in order to greatly exceed that of diesel cycle engines.

Indeed, calculations and simulations demonstrate that the thermodynamic efficiency of a piston volumetric regenerative Brayton cycle engine can reach or even exceed seventy percent, which in practice can lead to the production of engines of which the brake energy efficiency exceeds sixty percent once the inevitable thermal and mechanical irreversibilities due to the very constitution of said engines have been deducted.

The problem encountered with the fluid cushion sealing device of patent No. FR 3032252 is that the temperature of the cylinder still remains excessive for the available materials of which the perforated continuous ring can be made.

Indeed, in order for the efficiency of a piston volumetric regenerative Brayton cycle engine to be significantly higher than that of existing diesel engines, the gases must be introduced into its expansion valve at a temperature of around one thousand three hundred degrees Celsius, under a pressure of approximately twenty bars.

It results from these operational conditions that the temperature of the inner walls of the expansion valve stabilizes around nine hundred and fifty degrees Celsius.

Given that the continuous perforated ring according to patent No. FR 3032252 is close to the cylinder with which it engages by only a few microns, in practice, said ring takes the temperature of about nine hundred and fifty degrees Celsius of said cylinder.

Yet, no material can make it possible both to manufacture said ring and to withstand such a temperature.

Even a superalloy such as "Udimet 720" in particular used in aeronautics and in the space industry and known for its resistance to extreme temperatures cannot withstand such a temperature without being subject to creep and while being subjected to the inflation stress imposed by the continuous perforated ring of the fluid cushion sealing device according to patent No. FR 3032252.

It is for this reason in particular, and in order to make use of materials which are more common than high-temperature-resistant ceramics, that the regenerative cooling system of patent No. EP 3585993 published on Apr. 7, 2021 and belonging to the applicant provides for the temperature of the inner walls of the expansion valve, and in particular of the cylinder, to be lowered to practical values of around seven hundred degrees Celsius.

For example, the "Udimet 720" superalloy withstands creep at a temperature of seven hundred degrees Celsius if it is subjected to a stress not exceeding two hundred and thirty megapascals.

The regenerative cooling system according to patent No. EP 3585993 provides a cooling enclosure which surrounds the expansion valve while leaving a gas circulation space between said enclosure and said expansion valve in which the gases leaving the expansion valve itself circulate at a temperature of between five hundred and six hundred degrees Celsius.

Thus, according to the regenerative cooling system according to patent No. EP 3585993, the exhaust gases of the expansion valve maintain the temperature of the inner walls of the expansion valve at a temperature of around seven hundred degrees Celsius, while the heat exported by said gases is essentially recovered in order to be reintroduced into the cycle by the regenerative heat exchanger comprised in the piston regenerative Brayton cycle reciprocating engine.

In this context, the fluid cushion sealing device of patent No. FR 3032252 can be used with a continuous perforated ring, for example made of "Udimet 720" superalloy.

However, in return for this possibility, the cylinder and the cylinder heads of the piston regenerative Brayton cycle reciprocating engine must be made of materials with a high nickel content, such as "Niresist" cast iron, which, owing to the high volatility and the high price of nickel, represents an economic disadvantage.

In any case, it is noted that the temperature of the expansion valve remains at least six hundred degrees Celsius higher than that of the rest of the engine and in particular of the movable coupling and of the transmission casing in which said coupling is housed.

Advantageously, the differential expansions which result from this temperature difference can in particular be managed by the double-acting expansion cylinder with adaptive support which is the subject of patent No. EP3350433 issued on Aug. 7, 2019 and belonging to the applicant.

Said support allows an isotropic or anisotropic expansion of the expansion cylinder which is very different from that of the transmission casing to which it is fixed, without compromising either the operation of said cylinder, nor that of the piston which moves in said cylinder.

Said support also maintains the piston centered in the cylinder, transmits the axial forces resulting from the expansion of the gases to the transmission casing, and limits heat transfers from the expansion valve cylinder to said casing Upon reading the above, it will be understood that no configuration is fully satisfactory at this stage that makes it possible to produce a piston regenerative Brayton cycle reciprocating engine under the best possible conditions.

Indeed, the fluid cushion sealing device must be supplied with compressed air by a compressor which consumes some of the work available on the shaft of the piston regenerative Brayton cycle reciprocating engine, to the detriment of the total efficiency of the latter.

This reduces the final energy efficiency of said engine, all the more so if the latter operates at low power because the amount of compressed air to be supplied to the fluid cushion sealing device is almost constant, regardless of the speed and load of said engine.

Moreover, in order to guarantee lasting operation of the fluid cushion sealing device, recourse must be had to the regenerative cooling system according to patent No. EP 3585993, yet, said system is not energy neutral.

Indeed, said cooling system makes the path of the gases expelled from the expansion valve tortuous and induces pressure losses which reduce the total efficiency of the piston regenerative Brayton cycle reciprocating engine.

Furthermore, the heat extracted from the inner walls of the expansion valve by the regenerative cooling system is reintroduced into the Brayton cycle upstream of a burner or a hot source by a regenerative heat exchanger, the efficiency of which is not one hundred percent.

Some of the heat extracted from the inner walls of the expansion valve is therefore lost, and the power passing through the exchanger increases due to the presence of said cooling system.

In addition, the specific power of the piston regenerative Brayton cycle reciprocating engine is substantially reduced by the regenerative cooling system according to patent No. EP 3585993, which involves upward revision of the sizing of said engine in order to meet the power objectives of the application for which it is intended.

It is also noted that the development of the fluid cushion sealing device of patent No. FR 3032252 remains complex, particularly in order to ensure its correct operation in the scope of non-stationary applications subjected to shocks and vibrations.

SUMMARY OF THE INVENTION

That is why, without excluding any other application in any field whatsoever, the hot cylinder head and cold cylinder reciprocating heat engine according to the invention is provided, inter alia, for making piston regenerative Brayton cycle reciprocating engines in which the mainly hot expansion valve limits heat losses, while at the same time ensuring robust and durable sealing between the piston and the cylinder of said expansion valve.

In the field of application of piston reciprocating heat machines in general and of heat engines in particular, the result of the invention is a multi-temperature double-acting engine:

- the piston crowns of which are maintained at a high temperature so as to limit the cooling of the hot gases in contact therewith;
- the sealing of which with the cylinder with which it engages can be achieved by means of segments made of cast iron or steel such as those comprised in conventional spark-ignition or diesel cycle internal combustion engines;
- which no longer uses the fluid cushion sealing device which is the subject matter of patent No. FR 3032252 and therefore, which no longer requires the engine that receives it to be equipped with the regenerative cooling system such as that described in patent No. EP 3585993, said engine therefore no longer undergoing neither the power and efficiency losses associated with the use of a compressor for supplying said sealing device, nor the additional pressure losses at the outlet of the expansion valve associated with a more tortuous path of the gases, or the heat losses due to the efficiency of the regenerative heat exchanger of less than “one”, nor the specific power losses of the engine associated with this configuration.

Consequently, the multi-temperature double-acting piston according to the invention makes it possible to avoid the engine which houses it being manufactured with materials having a high nickel content, such as “Niresist” cast iron, it being possible for the cylinder of said engine to be made of low-cost cast iron such as that usually used for making the cylinder casings of automotive diesel engines, and it being possible for said engine to comprise hot cylinder heads operating at high temperature and made of silicon carbide, a material having high mechanical strength at high temperatures, which material is abundant and cheap.

As an advantage induced by the multi-temperature double-acting piston according to the invention, the lower density of the silicon carbide which it allows to be used to produce the hot cylinder heads of the engine which houses it, on the one hand, and the absence of a regenerative cooling system, on the other hand, lead to a lower weight and a lower total heat capacity of said engine.

This promotes a fast rise in temperature of said engine by reducing the energy required to reach its operating temperature, and leads to a lower energy consumption of said engine, particularly when the latter is applied to road, rail or sea transport.

It is understood that the multi-temperature double-acting piston according to the invention can be applied, in addition to heat engines which are generally stationary or mobile and which have internal or external combustion, to any other application which is similar in design and in principle and which could advantageously take advantage of the particular features and functionalities of said piston according to the invention.

The other features of the present invention have been described in the description and in the secondary claims depending directly or indirectly on the main claim.

The multi-temperature double-acting piston being able to move in translation in a cold cylinder arranged in a cooled cylinder casing that comprises a heat engine, said piston being directly or indirectly connected by power transmission means housed in a transmission casing to at least one rotary or reciprocating power output shaft while said piston forms a lower variable volume chamber with the cold cylinder and a lower cylinder head which is positioned between said piston and the transmission casing, said piston simultaneously forming a higher variable volume chamber with said cylinder and an upper cylinder head, said chambers, containing a working gas, comprises

- a central piston pin which is approximately coaxial with the cold cylinder and a first end of which forms a lower piston rod that passes right through the lower cylinder head via a lower rod orifice that engages with lower rod sealing means so as to open out into the transmission casing and so as to be connected directly or indirectly to the power transmission means via piston fixing means, while the second end of said pin forms an upper piston rod that passes right through the upper cylinder head via an upper rod orifice that engages with upper rod sealing means so as to open out into a piston cooling and lubricating chamber connected to a source of lubricating-cooling fluid, the latter introducing a lubricating-cooling fluid into said chamber;
- a peripheral sealing ring, the outer diameter of which is substantially smaller than the inner diameter of the cold cylinder, said ring comprising piston sealing means which are in contact with said cylinder in order to provide sealing therewith;
- a lower radial connecting disk which radially connects the central piston pin with the peripheral sealing ring on the lower variable volume chamber side, and an upper radial connecting disk which radially connects the central piston pin with the peripheral sealing ring on the upper variable volume chamber side, the space left between said disks, the peripheral sealing ring and the central piston pin forming an internal piston volume;

a lubricating-cooling gallery arranged mainly axially in the central piston pin and in one or more sections, said gallery putting the piston cooling and lubricating chamber into communication with the internal piston volume, on the one hand, and said volume with the inside of the transmission casing, on the other hand;

at least one peripheral ring lubricating orifice which puts the internal piston volume into communication with the outer peripheral face of the peripheral sealing ring, said orifice opening out axially from said face between at least two piston sealing means;

guide means which bear directly or indirectly against or in the vicinity of the power transmission means and/or of the cold cylinder and/or of the lower cylinder head and/or of the upper cylinder head, said means holding directly or indirectly the peripheral sealing ring centered in the cold cylinder;

a lower hot crown interposed between the lower radial connecting disk and the lower variable volume chamber and/or an upper hot crown interposed between the upper radial connecting disk and the upper variable volume chamber;

means for applying the crown which directly or indirectly hold the lower hot crown applied against the peripheral sealing ring and/or against the lower radial connecting disk, and/or which directly or indirectly hold the upper hot crown applied against said ring and/or against the upper radial connecting disk, said means leaving said crown free to expand relative to said ring and/or to said disks;

crown centering means which locate the lower hot crown and/or the upper hot crown relative to the peripheral sealing ring.

The multi-temperature double-acting piston according to the invention comprises a lower hot crown and/or an upper hot crown which are entirely or partially made of a material resistant to high temperatures.

The multi-temperature double-acting piston according to the invention comprises a material which is resistant to high temperatures and which mainly consists of silicon carbide.

The multi-temperature double-acting piston according to the invention comprises thermal insulation means and/or crown sealing means which are interposed either between the lower hot crown and the peripheral sealing ring and/or the lower radial connecting disk, or between the upper hot crown and said ring and/or the upper radial connecting disk, or both.

The multi-temperature double-acting piston according to the invention comprises thermal insulation means and/or crown sealing means which are interposed either between the lower hot crown and the central piston pin, or between the upper hot crown and said pin, or both.

The multi-temperature double-acting piston according to the invention comprises thermal insulation means which consist of at least one insulating ring made of a material of low thermal conductivity.

The multi-temperature double-acting piston according to the invention comprises a material of low thermal conductivity that mainly consists of zirconium oxide.

The multi-temperature double-acting piston according to the invention comprises an insulating ring which is held directly or indirectly in contact with the central piston pin and/or the peripheral sealing ring and/or the lower hot crown and/or the lower radial connecting disk and/or the upper hot crown and/or the upper radial connecting disk by means of at least one contact edge of small surface area.

The multi-temperature double-acting piston according to the invention comprises an insulating ring which is held directly or indirectly in contact with the central piston pin and/or the peripheral sealing ring and/or the lower hot crown and/or the lower radial connecting disk and/or the upper hot crown and/or the upper radial connecting disk by means of at least one insulating ring sealing gasket which is sealed against the working gas.

The multi-temperature double-acting piston according to the invention comprises crown applying means which directly or indirectly hold the lower hot crown applied to the peripheral sealing ring and/or to the lower radial connecting disk, which are formed by an outer coaxial lower pin tube which surrounds the central piston pin, said tube bearing, on the one hand, on the lower hot crown in the vicinity of said pin and, on the other hand, on the power transmission means.

The multi-temperature double-acting piston according to the invention comprises crown applying means which hold the upper hot crown applied directly or indirectly against the peripheral sealing ring and/or against the upper radial connecting disk, and which are formed by an upper outer coaxial pin tube that surrounds the central piston pin, said tube bearing, on the one hand, against the upper hot crown in the vicinity of said pin, and on the other hand, against an upper rod abutment which is formed directly or indirectly on the upper piston rod in the vicinity of its end that opens out into the piston cooling and lubricating chamber.

The multi-temperature double-acting piston according to the invention comprises some or all of the ends of a lower outer coaxial pin tube and/or of an upper outer coaxial pin tube which receive a tube spring by means of which said tubes bear respectively against the lower hot crown and against the power transmission means and/or against the upper hot crown and against the upper rod abutment.

The multi-temperature double-acting piston according to the invention comprises a lower hot crown and/or an upper hot crown which has a crown concave conical surface by means of which said crown is held applied by the crown applying means against a circular peripheral contact edge which is directly or indirectly secured to the peripheral sealing ring and/or to the periphery of the lower radial connecting disk and/or to the periphery of the upper radial connecting disk, the angle of the concave cone formed by the said surface being such that, when the said surface slides on said edge due to the difference between the thermal expansion of the said crown and that of the assembly formed by the peripheral sealing ring, the lower radial connecting disk, the upper radial connecting disk and the central piston pin, the axial distance which separates the bearing point of the crown applying means on said crown of the peripheral sealing ring remains approximately constant, all else being equal, while the crown concave conical surface and the circular peripheral contact edge form the crown centering means.

The multi-temperature double-acting piston according to the invention comprises piston fixing means which consist of an axial double-acting piston screw which comprises, on the one hand, a piston screw body which is housed in a piston screw tunnel which passes through the central piston pin in the longitudinal direction thereof, said screw comprising, on the one hand, a piston screw head which bears against the end of the upper piston rod which opens out into the piston cooling and lubricating chamber, and, on the other hand, a piston screw thread which is screwed into the power transmission means.

The multi-temperature double-acting piston according to the invention comprises a piston screw tunnel which forms at least one part of the lubricating-cooling gallery, the lubricating-cooling fluid being able to circulate between the piston screw body and the inner wall of said tunnel, the latter which forms with said body, a first section which extends from the piston cooling and lubricating chamber to the internal piston volume, and a second section which extends from said volume inside the transmission casing.

The multi-temperature double-acting piston according to the invention comprises guide means which consist of a barrel skirt which is arranged on the outer periphery of the peripheral sealing ring and which bears against the cold cylinder.

The multi-temperature double-acting piston according to the invention comprises a lubricating-cooling gallery which opens out into the internal piston volume via a small axial clearance which is left between, on the one hand, a fluid distribution disk which is received in said volume and on the other hand the upper radial connecting disk, said distribution disk being approximately parallel to said radial connecting disk and forming, on the one hand, a sealing with the central piston pin, and on the other hand ending radially in the vicinity of the inner wall of the peripheral sealing ring, the lubricating-cooling fluid coming from the piston cooling and lubricating chamber being able to leave from said vicinity.

The multi-temperature double-acting piston according to the invention comprises a central piston pin which comprises, inside the internal volume and in the vicinity of the lower radial connecting disk, a fluid recirculation collar which, when the central piston pin moves towards the lower cylinder head, rejects radially and towards the inner wall of the peripheral sealing ring the lubricating-cooling fluid which has accumulated in said volume and on the surface of said disk.

The multi-temperature double-acting piston according to the invention comprises a lower radial connecting disk which has a hollow shape at its connection with the central piston pin, said shape constituting an overflow reservoir which can store lubricating-cooling fluid, while at least one overflow orifice which communicates with the inside of the transmission casing via the lubricating-cooling gallery sets the maximum level of said reservoir.

The multi-temperature double-acting piston according to the invention comprises a fluid nozzle supplied by the source of lubricating-cooling fluid which opens out into the piston cooling and lubricating chamber in order to inject a jet of fluid therein.

The multi-temperature double-acting piston according to the invention comprises a fluid nozzle which injects a jet of lubricating-cooling fluid into an axial screw reservoir which is arranged axially in the piston screw head, said reservoir communicating with the lubricating-cooling gallery via at least one radial reservoir-gallery connection duct.

The multi-temperature double-acting piston according to the invention comprises a screw check valve which is housed in the axial screw of the double-acting piston, said valve enabling the lubricating-cooling fluid to go from the axial screw reservoir to the lubricating-cooling gallery, but not conversely.

The multi-temperature double-acting piston according to the invention comprises a piston cooling and lubricating chamber which is connected to an air source by an air intake check valve which lets fluid forcing air enter into said chamber without letting it leave, while said chamber is connected to an air tarpaulin by a pressure-limiting valve that lets the fluid forcing air go from said chamber to said tarpaulin when the pressure of said air in said chamber reaches a certain value.

The multi-temperature double-acting piston according to the invention comprises a reflecting screen which is interposed between the lower hot crown and the lower radial connecting disk, to which a part of the peripheral sealing ring can be added, and/or between the upper hot crown and the upper radial connecting disk, to which a part of said ring can be added.

The multi-temperature double-acting piston according to the invention comprises thermal insulation means which consist of a honeycomb or fibrous insulating material which occupies all or part of the space lying between the lower hot crown and the lower radial connecting disk and/or between the upper hot crown and the upper radial connecting disk.

The multi-temperature double-acting piston according to the invention comprises at least one first radial space left between the outer coaxial upper pin tube and the central piston pin, at least one second radial space left between the lower outer coaxial pin tube and the central piston pin, and a plurality of radial spaces left between the piston screw body and the inner wall of the piston screw tunnel that form at least one part of the lubricating-cooling gallery, the lubricating-cooling fluid being able to circulate successively in said spaces to go from the piston cooling and lubricating chamber to the internal piston volume, then from said volume inside the transmission casing.

The multi-temperature double-acting piston according to the invention comprises lower rod sealing means and/or upper rod sealing means which consist of an extensible continuous ring which is directly or indirectly secured to the cooled cylinder casing, and the inner diameter of which is substantially smaller than the outer diameter of the lower piston rod or of the upper piston rod that it clamps.

The multi-temperature double-acting piston according to the invention comprises an extensible continuous ring which is connected to a ring plate by a ring tube of small radial thickness, said ring, said plate, and said ring being made out of one single and same piece of material.

The multi-temperature double-acting piston according to the invention comprises an extensible continuous ring which is clamped axially between two ring bushings by an axial compression spring for a ring.

BRIEF DESCRIPTION OF THE DRAWINGS

The following description given by way of non-limiting examples and with reference to the accompanying drawings, makes it possible to understand the invention better, and to understand the features that it presents, and the advantages that it is likely to provide:

FIG. 1 is a three-dimensional view of a heat engine such as can be provided for receiving the multi-temperature double-acting piston according to the invention, said engine forming an expansion valve which makes it possible, for example, to implement a regenerative Brayton thermodynamic cycle.

FIG. 2 is a three-dimensional cross-sectional view of the multi-temperature double-acting piston according to the invention, housed in the heat engine shown in FIG. 1, said engine also being shown as a three-dimensional cross-section.

FIG. 3 is a cross-sectional view of the multi-temperature double-acting piston according to the invention, housed in the heat engine shown in FIG. 1, said engine also being shown as a cross-section.

FIG. 4 is a three-dimensional cross-sectional view of the multi-temperature double-acting piston according to the invention, said piston being connected to the power transmission means by an axial double-acting piston screw, while the crown applying means consist, in particular, of a lower outer coaxial pin tube and an upper outer coaxial pin tube.

FIG. 5 is an exploded three-dimensional view of the multi-temperature double-acting piston according to the invention and according to its particular configuration shown in FIGS. 2 to 5.

FIG. 6 is a close-up cross-sectional view of the multi-temperature double-acting piston according to the invention in the context of the engine shown in FIG. 1, said view showing in particular how said piston is connected to the power transmission means, and how the lower hot crown is held applied against the peripheral sealing ring by a lower outer coaxial pin tube by means of insulating rings.

FIG. 7 is a close-up cross-sectional view of the multi-temperature double-acting piston according to the invention in the context of the engine shown in FIG. 1, said view showing in particular how the upper piston rod opens out into the piston cooling and lubricating chamber, and how the upper hot crown is held applied against the peripheral sealing ring by an upper outer coaxial pin tube by means of insulating rings.

FIG. 8 is a cross-sectional view of the multi-temperature double-acting piston according to the invention as shown in FIGS. 2 to 7, said view showing how a lubricating-cooling fluid can circulate from an axial screw reservoir to the inside of the transmission casing in order to successively cool the upper radial connecting disk, the peripheral sealing ring and the lower radial connecting disk, while cooling and lubricating the piston sealing means and the barrel skirt that said ring has, said means and said skirt being maintained in contact with the cold cylinder.

FIG. 9 is a cross-sectional view of the multi-temperature piston double-acting according to the invention as shown in FIG. 8, said view showing in particular how the lubricating-cooling fluid can recirculate inside the internal piston volume in order to complete the cooling of the mechanically welded assembly formed by the peripheral sealing ring, the lower radial connecting disk, the upper radial connecting disk and the central piston pin, and in order to supply peripheral ring lubricating orifices comprised in the peripheral sealing ring.

FIG. 10 is a close-up schematic cross-sectional view of the multi-temperature double-acting piston according to the invention and of the particular configuration of said piston as shown in FIGS. 2 to 9, said view showing the positions and dimensions of the lower and upper hot crowns relative to the welded mechanical assembly and to the insulating ring when said crowns are cold.

FIG. 11 is a close-up schematic cross-sectional view of the multi-temperature double-acting piston according to the invention and of the particular configuration of said piston as shown in FIGS. 2 to 9, said view showing the positions and dimensions of the lower and upper hot crowns relative to the welded mechanical assembly and to the insulating ring when said crowns are hot.

FIG. 12 is a three-dimensional view aligned with the piston cooling and lubricating chamber of the multi-temperature double-acting piston according to the invention, said view showing in particular the air intake check valve and the pressure-limiting valve, both of which are connected to the inside of the transmission casing, which in this case acts as an air source and an air tarpaulin.

FIG. 13 is a cross-sectional view of a variant of the multi-temperature double-acting piston according to the invention according to which a part of the lubricating-cooling gallery is formed by a radial space left between, on the one hand, the upper outer coaxial pin tube and the lower outer coaxial pin tube and, on the other hand, the central pin of the piston, while a reflecting screen and a honeycomb or fibrous insulating material are interposed between the lower and upper hot crowns and the lower and upper radial connecting disk with which said crowns face.

FIG. 14 is a close-up cross-sectional view of the upper rod sealing means of the multi-temperature double-acting piston according to the invention, said means consisting of an extensible continuous ring connected to a ring plate by a ring tube with a small radial thickness.

FIG. 15 is a close-up cross-sectional view of the upper rod sealing means of the multi-temperature double-acting piston according to the invention, said means consisting of a continuous axially extensible ring clamped between two ring bushings by an axial compression spring for a ring.

DESCRIPTION OF THE INVENTION

FIGS. 1 to 12 show the multi-temperature double-acting piston 201 according to the invention, various details of its components, its variants, and its accessories.

As shown in FIGS. 2, 3, 6, and 7, the multi-temperature double-acting piston 201 can move in translation in a cold cylinder 204 formed in a cooled cylinder casing 203 of a heat engine 202, said piston 201 being connected directly or indirectly by power transmission means 205 housed in a transmission casing 206 to at least one rotary or reciprocating power output shaft 207.

As can be clearly seen in FIG. 7, said piston 201 forms a lower variable volume chamber 208 with the cold cylinder 204 and a lower cylinder head 213 which is positioned between said piston 201 and the transmission casing 206, said piston 201 simultaneously forming an upper variable volume chamber 209 with said cylinder 204 and an upper cylinder head 214, said chambers 208, 209 containing a working gas 240.

As illustrated in FIGS. 2 to 5 and in FIGS. 8 and 9, the multi-temperature double-acting piston 201 according to the invention comprises a central piston pin 210 which is approximately coaxial with the cold cylinder 204, and a first end of which forms a lower piston rod 211 which passes right through the lower cylinder head 213 via a lower rod orifice 215 which engages with lower rod sealing means 280 to open out into the transmission casing 206 and to be connected directly or indirectly to the power transmission means 205 by piston fixing means 231.

The second end of said pin 210 forms an upper piston rod 212 which passes right through the upper cylinder head 214 via an upper rod orifice 216 which engages with upper rod sealing means 281 to open out into a piston cooling and lubricating chamber 217 connected to a source of lubricating-cooling fluid 218, the latter introducing a lubricating-cooling fluid 257 into said chamber 217.

It is noted that the lower rod sealing means 280 and the upper rod sealing means 281 can be respectively in contact with the lower piston rod 211 and with the upper piston rod 212 either directly or indirectly by means of respectively a lower outer coaxial pin tube 243 and an upper outer coaxial pin tube 248, as illustrated in FIGS. 2, 3, 6, 7, 14 and 15.

It is noted in FIGS. 2 to 11 that the multi-temperature double-acting piston 201 according to the invention comprises a peripheral sealing ring 220 having an outer diameter which is substantially smaller than the inner diameter of the cold cylinder 204.

It is noted in said figures that the peripheral sealing ring 220 comprises piston sealing means 221 consisting of, for example, compression segments 222 of cast iron or steel such as those usually found on the pistons of conventional automotive engines, said means 221 being in contact with said cylinder 204 in order to provide sealing therewith.

It can be seen very clearly in FIG. 4 that the multi-temperature double-acting piston 201 according to the invention also comprises a lower radial connecting disk 224 which radially connects the central piston pin 210 to the peripheral sealing ring 220 on the side of the lower variable volume chamber 208, and an upper radial connecting disk 225 which radially connects the central piston pin 210 to the peripheral sealing ring 220 on the side of the upper variable volume chamber 209, the space left between said disks 224, 225, the peripheral sealing ring 220 and the central piston pin 210 forming an internal piston volume 228.

It will be noted that the lower radial connecting disk 224 and/or the upper radial connecting disk 225 can be a simple metal disk, a cone, a dome or a truncosphere, or be of any geometry, whether non-ribbed or ribbed, to give said disks 224, 225 a great rigidity.

It is also noted that, as a variant of an embodiment of the multi-temperature double-acting piston 201 according to the invention, the lower radial connecting disk 224 can be connected inside the internal piston volume 228 to the upper radial connecting disk 225 by means of struts, spokes, fins, or any other mechanical connection that secures said disks 224, 225 together such that they constitute a rigid assembly.

It will also be noted that the lower radial connecting disk 224 and/or the upper radial connecting disk 225 can preferably be made secured to the central piston pin 210 and/or the peripheral sealing ring 220 by friction welding, electron beam welding or arc welding, or not any type of welding or assembly known to a person skilled in the art.

It can be seen in FIGS. 8 and 9 that the multi-temperature double-acting piston 201 according to the invention comprises a lubricating-cooling gallery 227 which is arranged mainly axially in the central piston pin 210 and in one or more sections, said gallery 227 putting the piston cooling and lubricating chamber 217 into communication, on the one hand, with the internal piston volume 228, and on the other hand with said volume 228 inside the transmission casing 206.

In FIGS. 10 and 11, it can be seen very clearly that the multi-temperature double-acting piston 201 according to the invention comprises at least one peripheral ring lubricating orifice 229 which puts the internal piston volume 228 into communication with the outer peripheral face of the peripheral sealing ring 220, said orifice 229 opening out axially from said face between at least two piston sealing means 221.

The multi-temperature double-acting piston 201 according to the invention also comprises guide means 230 which can be particularly seen in FIG. 4, said means 230 bearing directly or indirectly against or in the vicinity of the power transmission means 205 and/or the cold cylinder 204 and/or the lower cylinder head 213 and/or the upper cylinder head 214, said means 230 holding directly or indirectly the peripheral sealing ring 220 which is centered in the cold cylinder 204.

In particular, in FIG. 7, it is noted that the multi-temperature double-acting piston 201 according to the invention comprises a lower hot crown 226 interposed between the lower radial connecting disk 224 and the lower variable volume chamber 208, and/or an upper hot crown 232 interposed between the upper radial connecting disk 225 and the upper variable volume chamber 209.

The multi-temperature double-acting piston 201 according to the invention also comprises crown applying means 234, all of which appear in FIGS. 2 to 5 and in FIGS. 8 and 9, and which directly or indirectly hold the lower hot crown 226 applied against the peripheral sealing ring 220 and/or against the lower radial connecting disk 224, and/or which directly or indirectly hold the upper hot crown 232 applied against said ring 220 and/or against the upper radial connecting disk 225, said means 234 leaving said crowns 226, 232 free to expand relative to said ring 220 and/or to said disks 224, 225.

Finally, the multi-temperature double-acting piston 201 according to the invention comprises crown centering means 235—for example, shown in FIG. 7—which locate the lower hot crown 226 and/or the upper hot crown 232 relative to the peripheral sealing ring 220.

It will be noted that, according to a variant of an embodiment of the multi-temperature double-acting piston 201 according to the invention, the lower hot crown 226 and/or the upper hot crown 232 can be made in whole or in part of a material resistant to high temperatures 275 such as silicon carbide 276 and its various variants, whether or not alloyed with other materials.

As another variant shown in FIGS. 2 to 11, thermal insulation means 233 and/or crown sealing means 239 can be interposed either between the lower hot crown 226 and the peripheral sealing ring 220 and/or the lower radial connecting disk 224, or between the upper hot crown 232 and said ring 220 and/or the upper radial connecting disk 225, or both, said means 233, 239 possibly forming an integral part of said crowns 226, 232 and/or said disks 224, 225.

In FIGS. 4 to 9, it has also been shown that thermal insulation means 233 and/or crown sealing means 239 can be interposed either between the lower hot crown 226 and the central piston pin 210, or between the upper hot crown 232 and said pin 210, or both, said means 233, 239 being able to form an integral part of said crowns 226, 232 and/or of said pin 210.

Wherever they are located, the thermal insulation means 233 can consist of at least one insulating ring 236 made of a material with low thermal conductivity 237 such as zirconium oxide 238 and its various variants, whether or not alloyed with other materials, or such as quartz.

As a non-limiting alternative, the insulating ring 236 can also be made of quartz, the thermal conductivity of which is also low, and the low modulus of elasticity of which gives it a great ability to accommodate the geometry of the components with which it is in contact and engages.

It will be noted that the insulating ring 236 can be held directly or indirectly in contact with the central piston pin 210 and/or the peripheral sealing ring 220 and/or the lower hot crown 226 and/or the lower radial connecting disk 224 and/or the upper hot crown 232 and/or the upper radial connecting disk 225 by means of at least one contact edge 241 of small surface area.

It will be noted in FIGS. 10 and 11 that, advantageously, the insulating ring 236 can comprise a de-rigidification groove 291 which gives it more flexibility and which ensures a more homogeneous and better distributed contact between said ring 236 and the part 210, 220, 226, 224, 232, 225 with which said ring 236 engages.

According to a particular configuration of the multi-temperature double-acting piston 201, the insulating ring 236 can also be held directly or indirectly in contact with the central piston pin 210 and/or the peripheral sealing ring 220 and/or the lower hot crown 226 and/or the lower radial connecting disk 224 and/or the upper hot crown 232 and/or the upper radial connecting disk 225 by means of at least one insulating ring sealing gasket 242 which is sealed against the working gas 240.

It is noted that the insulating ring sealing gasket 242 can comprise a plurality of metal sheets, for example, as in the case of cylinder head gaskets in modern automotive internal combustion engines, or consist of materials that withstand high temperatures, such as the "Therma-pur" material developed by the company "Garlock".

As can be seen in FIGS. 2 to 9, the crown applying means 234 which hold the lower hot crown 226 applied directly or indirectly against the peripheral sealing ring 220 and/or applied against the lower radial connecting disk 224 can be formed by a lower outer coaxial pin tube 243 which surrounds the central piston pin 210, said tube 243 bearing, on the one hand, against the lower hot crown 226 in the vicinity of said pin 210 and, on the other hand, against the power transmission means 205 that can consist, for example, of a crosshead 244 that moves in translation in a crosshead cylinder 293, said crosshead 244 being hinged about the foot of a connecting rod 245 which is itself hinged about a crank 246 provided on a crankshaft 247, the latter forming the power output shaft 207.

It can also be seen in FIGS. 2 to 5 and in FIGS. 7 to 9, that the crown applying means 234 that hold the upper hot crown 232 applied directly or indirectly against the peripheral sealing ring 220 and/or against the upper radial connecting disk 225 can consist of an upper outer coaxial pin tube 248 which surrounds the central piston pin 210, said tube 248 bearing, on the one hand, against the upper hot crown 232 in the vicinity of said pin 210 and, on the second hand, against an upper rod abutment 249 which is provided directly or indirectly against the upper piston rod 212 in the vicinity of its end that opens out into the piston cooling and lubricating chamber 217.

As can be clearly seen in FIG. 4, some or all of the ends of the lower outer coaxial pin tube 243 and/or of the upper outer coaxial pin tube 248 can receive a tube spring 250 by means of which said tubes 243, 248 bear respectively on the lower hot crown 226 and on the power transmission means 205 and/or on the upper hot crown 232 and on the upper rod abutment 249, it being possible advantageously for the tube spring 250 to be formed by a stack of "Belleville" washers which are known per se.

FIGS. 10 and 11 illustrate that, according to a particular configuration of the multi-temperature double-acting piston 201 according to the invention, the lower hot crown 226 and/or the upper hot crown 232 can advantageously have a crown concave conical surface 251 by means of which said crown 226, 232 is held applied by the crown applying means 234 against a circular peripheral contact edge 252 which is directly or indirectly secured to the peripheral sealing ring 220 and/or to the periphery of the lower radial connecting disk 224 and/or to the periphery of the upper radial connecting disk 225.

According to said configuration, the angle of the concave cone formed by the crown concave conical surface 251 is such that, when said surface 251 slides on said edge 252 due to the difference between the thermal expansion of said crown 226, 232 and that of the assembly formed by the peripheral sealing ring 220, the lower radial connecting disk 224, the upper radial connecting disk 225 and the central piston pin 210, the axial distance which separates the bearing point of the crown applying means 234 on said crown 226, 232 from the peripheral sealing ring 220 remains approximately constant, all else being equal, while the concave conical surface of the crown 251 and the circular peripheral contact edge 252 form the crown centering means 235.

It is noted that this particular configuration of the multi-temperature double-acting piston 201 according to the invention makes it possible for the force to which the crown applying means 234—which are outside the image in FIGS. 10 and 11 but actually present—are subjected remains approximately constant regardless of the difference between the thermal expansion of said crown 226, 232 and that of the mechanically welded assembly 289 formed by the peripheral sealing ring 220, the lower radial connecting disk 224, the upper radial connecting disk 225 and the central piston pin 210.

Furthermore, said configuration makes it possible to limit the variation in the volumetric ratio of the heat engine 202 as a function of its temperature, in particular during cold start phases of said engine 202.

It is noted that advantageously and as a variant which is not shown, the peripheral circular contact edge 252 could advantageously present a spherical contact with the crown concave conical surface 251.

In FIGS. 2 to 9, it has been shown that the piston fixing means 231 can consist of an axial double-acting piston screw 219 which comprises firstly a piston screw body 255 which is housed in a piston screw tunnel 256 which passes right through the central piston pin 210 in the longitudinal direction thereof, said screw 219 comprising, on the one hand, a piston screw head 253 which bears against the end of the upper piston rod 212 which opens out into the piston cooling and lubricating chamber 217, and, on the other hand, a piston screw thread 254 which is screwed into the power transmission means 205.

According to a variant of an embodiment of the multi-temperature double-acting piston 201 according to the invention, a screw-nut assembly can replace the piston screw head 253 which can moreover be replaced by any other type of fixing which will be obvious to a person skilled in the art.

As can be clearly seen in FIGS. 8 and 9, the piston screw tunnel 256 can advantageously form at least one part of the lubricating-cooling gallery 227, the lubricating-cooling fluid 257 being able to circulate between the piston screw body 255 and the inner wall of said tunnel 256, the latter forming with said body 255 a first section that goes from the piston cooling and lubricating chamber 217 to the internal piston volume 228, and a second section that goes from said volume 228 to the inside of the transmission casing 206, the piston screw body 255 being able to comprise screw sealing bulges 258 for separating the piston screw tunnel 256 into sections, said bulges 258 being able for such purposes to have a bulge sealing gasket 259.

As is clearly illustrated in FIG. 4, the guide means 230 can consist of a barrel skirt 260 which is arranged at the outer periphery of the peripheral sealing ring 220 and which bears against the cold cylinder 204, said skirt 260 having a convergent shape which promotes the establishment of a hydrodynamic lubricating regime between itself and the cold cylinder 204 with which it engages.

It can be seen clearly in FIGS. 10 and 11 that the barrel skirt 260 can advantageously be positioned between two compression segments 222 and adjoin an oil scraper segment 278.

FIG. 8 illustrates that the lubricating-cooling gallery 227 can open out into the internal piston volume 228 via a small axial clearance left between, on the one hand, a fluid distribution disk 261 which is housed in said volume 228 and, on the other hand, the upper radial connecting disk 225, said distribution disk 261 being approximately parallel to said radial connecting disk 225 and forming, on the one hand, a sealing with the central piston pin 210, and ending, on the other hand, radially in the vicinity of the inner wall of the peripheral sealing ring 220, the lubricating-cooling fluid 257 coming from the piston cooling and lubricating chamber 217 being able to leave at said vicinity, for example via distribution weirs 290, orifices or crenelations of any kind that can be arranged at the periphery of the fluid distribution disk 261.

As is well illustrated in FIG. 9, according to a particular variant of the multi-temperature double-acting piston 201 according to the invention, the central piston pin 210 can comprise, inside the internal piston volume 228 and in the vicinity of the lower radial connecting disk 224, a fluid recirculation collar 262 which, when the central piston pin 210 moves towards the lower cylinder head 213, radially rejects, and towards the inner wall of the peripheral sealing ring 220, the lubricating-cooling fluid 257 which has accumulated in said volume 228 and on the surface of said disk 224, said collar 262 possibly comprising collar grooves 263 which form radial jets of lubricating-cooling fluid 257 which are uniformly distributed over three hundred and sixty degrees.

Particularly in FIG. 8, it is noted that the lower radial connecting disk 224 can advantageously have a hollow shape 294 at its connection with the central piston pin 210, said shape 294 constituting an overflow reservoir 264 which can store lubricating-cooling fluid 257, while at least one overflow orifice 265 which communicates with the inside of the transmission casing 206 via the lubricating-cooling gallery 227 set the maximum level of said reservoir 264 such that, at each acceleration towards the upper cylinder head 214 of the multi-temperature double-acting piston 201 according to the invention, the level of the lubricating-cooling fluid 257 contained in said reservoir 264 does not exceed that of the overflow orifice 265, said excess fluid 257 being expelled inside the transmission casing 206.

In FIG. 7, it is noted that a fluid nozzle 266 supplied by the source of lubricating-cooling fluid 218 can open out into the piston cooling and lubricating chamber 217 in order to inject therein a fluid jet 267 which is shown in FIGS. 8 and 9.

Still in FIGS. 8 and 9, it can be seen that the fluid nozzle 266 can inject a jet of lubricating-cooling fluid 257 into an axial screw reservoir 267 which is arranged axially in the piston screw head 253, said reservoir 267 communicating with the lubricating-cooling gallery 227 via at least one radial reservoir-gallery connection duct 268.

FIGS. 8 and 9 also show clearly that a screw check valve 269 can be housed in the double-acting piston axial screw 219, said valve 269 enabling the lubricating-cooling fluid 257 to flow from the axial screw reservoir 267 to the lubricating-cooling gallery 227, but not conversely, such that at each acceleration towards the upper cylinder head 214 of the multi-temperature double-acting piston 201 according to the invention, the lubricating-cooling fluid 257 contained in said reservoir 267 is forced to penetrate into the lubricating-cooling gallery 227, while when said piston 201 accelerates towards the lower cylinder head 213, said fluid 257 contained in said gallery 227 does not return to said reservoir 267.

As a variant of the multi-temperature double-acting piston 201 according to the invention, FIG. 12 shows that the piston cooling and lubricating chamber 217 can be connected to an air source 270 or to any source of gas of any kind by an air intake check valve 271 which lets a fluid forcing air 272 enter said chamber 217 without letting it leave, while said chamber 217 is connected to an air tarpaulin 273 by a pressure-limiting valve 274 which lets the fluid forcing air 272 go from said chamber 217 to said tarpaulin 273 when the pressure of said air 272 in said chamber 217 reaches a certain value.

According to this particular configuration of the multi-temperature double-acting piston 201 according to the invention, the pressure which supplies the fluid nozzle 266 with lubricating-cooling fluid 257 is advantageously greater than the opening pressure of the pressure-limiting valve 274.

It is also noted in FIG. 12 that the altitude of the duct which connects the piston cooling and lubricating chamber 217 to the pressure-limiting valve 274 can determine the maximum level of the lubricating-cooling fluid 267 in said chamber 217, said duct acting as an overflow.

As shown in FIG. 13, a reflecting screen 295 can be interposed between the lower hot crown 226 and the lower radial connecting disk 224 to which a part of the peripheral sealing ring 220 can be added, and/or between the upper hot crown 232 and the upper radial connecting disk 225 to which a part of said ring 220 can be added, said reflecting screen 295 returning to the lower hot crown 226 and/or to the upper hot crown 232 the heat emitted, in particular in the form of infrared radiation, by said crown 226, 232.

It has also been shown in FIG. 13 that the thermal insulation means 233 can be consist of a honeycomb or fibrous insulating material 296 that occupies all or part of the space lying between the lower hot crown 226 and the lower radial connecting disk 224 and/or between the upper hot crown 232 and the upper radial connecting disk 225.

FIG. 13 also illustrates that at least one first radial space left between the upper outer coaxial pin tube 248 and the central piston pin 210, at least one second radial space left between the lower outer coaxial pin tube 243 and the central piston pin 210, and a plurality of radial spaces left between the piston screw body 255 and the inner wall of the piston screw tunnel 256 can form at least one part of the lubricating-cooling gallery 227, the lubricating-cooling fluid 257 being able to circulate successively in said spaces going from the piston cooling and lubricating chamber 217 to the internal piston volume 228, then from said volume 228 inside the transmission casing 206.

According to this particular configuration of the multi-temperature double-acting piston according to the invention, the outer wall of the upper outer coaxial pin tube 248 and the outer wall of the lower outer coaxial pin tube 243 are always maintained at a low temperature, such that a film of lubricating oil that covers the outer wall of said tubes 248, 243 is preserved from any coking or spontaneous combustion by excess temperature, including when the heat engine 202 is stopped after operating at a high temperature, and particularly insofar as an electric pump is provided that forces lubricating-cooling fluid 257 to circulate in the lubricating-cooling gallery 227 after said engine 202 has been stopped.

It has been shown in FIGS. 14 and 15 that the lower rod sealing means 280 and/or the upper rod sealing means 281 can consist of an extensible continuous ring 297 which is directly or indirectly secured to the cooled cylinder casing 203, and the inner diameter of which is substantially smaller than the outer diameter of the lower piston rod 211 or the upper piston rod 212 that it clamps.

It is noted that in this case, the radial thickness and the axial thickness of the extensible continuous ring 297 are advantageously small to limit the energy losses produced by the friction of said ring 297 on the lower piston rod 211 and/or the upper piston rod 212.

FIG. 14 illustrates that the extensible continuous ring 297 can be connected to a ring plate 298 by a ring tube 299 of small radial thickness, said ring 297, said plate 298, and said ring 297 being made of one single piece of material.

It is noted that, in this case and advantageously, the ring plate 298 can move radially and sealingly in the cooled cylinder casing 203, directly or indirectly, and comprise at least one radial ring stop 303 which limits its eccentricity relative to the lower piston rod 211 or relative to the upper piston rod 212.

Another variant illustrated in FIG. 15 provides that the continuous extensible ring 297 can be axially clamped between two ring bushings 300 by an axial ring compression spring 301 which can engage with a sealed ring bushing 302, the two ring bushings 300 being able to expose to the lower piston rod 211 or to the upper piston rod 212 a radial ring stop 303 which can come into contact with said rod 211, 212.

Operation of the Invention

The operation of the multi-temperature double-acting piston 201 according to the invention is easily understood with reference to FIGS. 1 to 15.

Said piston 201 can apply to any heat engine 202 performing a Beau de Rochas, Miller, Atkinson, Diesel cycle, or any other thermodynamic cycle known to a person skilled in the art.

FIGS. 1 to 15 show the multi-temperature double-acting piston 201 according to the invention as it can be used in a heat engine 202 that performs a regenerative Brayton cycle which is identical to the cycle performed by the transfer-expansion and regeneration heat engine of patent No. WO2016120560.

In this particular context, said piston 201 applies only to the expansion valve 279 of said engine 202, and the other members of the latter, such as one or more compressors, a burner, or a regenerative exchanger necessary for implementing the regenerative Brayton cycle, are not shown.

The objective of the multi-temperature double-acting piston 201 according to the invention is to limit as much as possible the heat losses of the working gas 240 during the expansion phase of said gas 240 carried out during the regenerative Brayton cycle, while ensuring that said piston 201 achieves with the cold cylinder 204 a good sealing by using only conventional piston sealing means 221, in this case compression segments 222 similar to those which equip automotive internal combustion engines produced in large quantities, said segments 222 engaging with an oil scraper segment 278.

In particular, holding this objective implies that as much as possible of the outer wall surface of the multi-temperature double-acting piston 201 is maintained at high temperature.

To achieve this objective, the multi-temperature double-acting piston 201 according to the invention also needs to provide good sealing with the lower cylinder head 213 and with the upper cylinder head 214, respectively by means of lower rod sealing means 280 and by means of upper rod sealing means 281, said means 280, 281 being formed either by metal cut segments 282 which are known per se, or by an extensible continuous ring 297 which is secured directly or indirectly to the cooled cylinder casing 203, as shown in FIGS. 14 and 15.

In order for said objective to be fully achieved, the multi-temperature double-acting piston 201 according to the invention advantageously applies to a heat engine 202 based on the same said objective and which, as such, minimizes heat losses from the working gas 240 by having the largest possible part of its inner walls raised to high temperature.

This is why FIGS. 1 to 3 show a heat engine 202, the expansion valve 279 of which receives the multi-temperature double-acting piston 201, said expansion valve 279 comprising a lower cylinder head 213 and an upper cylinder head 214 the operating temperature of which is high—of around nine hundred and fifty degrees Celsius—said cylinder heads 213, 214 being made of silicon carbide 276, a material which maintains its mechanical features up to temperatures of around one thousand four hundred degrees Celsius, and which can be used in an oxidizing medium at these high temperatures.

Only the internal surfaces of said expansion valve 279 which are in contact both with the working gas 240 and with the piston sealing means 221 are maintained at a temperature of only one hundred degrees Celsius, said temperature remaining compatible with a lubricating-cooling fluid 257 such as lubricating and cooling oil 283, and preventing the latter—in this case engine oil which is known per se—from coking, burning, or degrading prematurely.

As can be seen in FIGS. 2 and 3, said surfaces are, in addition to the cold cylinder 204 arranged in a cooled cylinder casing 203, a part of the peripheral sealing ring 220, a part of the lower piston rod 211 and a part of the upper piston rod 212, these members 220, 204, 211, 212 totaling a surface in contact with the working gas 240 much smaller than that totaled by the lower cylinder head 213, the upper cylinder head 214, the lower hot crown 226, and the upper hot crown 232.

In FIGS. 2 and 3, the power transmission means 205 which are housed in the transmission casing 206 and which are, in this case, provided to transform the reciprocating movements of said piston 201 in the cold cylinder 204 into a continuous rotational movement of a crankshaft 247 have been shown by way of example of a particular implementation of the multi-temperature double-acting piston 201 according to the invention.

Still according to this non-limiting embodiment, the transmission casing 206 and the power transmission means 205 are advantageously maintained at a temperature close to one hundred degrees Celsius, compatible with the lubricating and cooling oil 283.

It is noted in FIGS. 2 and 3 that the power transmission means 205 consist, by way of example, of a connecting rod 245 which is connected to the lower piston rod 211 by means of a crosshead 244, said connecting rod 34 being hinged about a crank 246 provided on the crankshaft 247, the latter forming a power output shaft 207.

As can be seen clearly in FIGS. 2 to 5 and in FIGS. 8, 9, and 13, the mechanically welded assembly 289 formed by the peripheral sealing ring 220, the lower radial connecting disk 224, the upper radial connecting disk 225, and the central piston pin 210 are fixed to the crosshead 244 by an axial double-acting piston screw 219 the piston screw body 255 of which is received in a piston screw tunnel 256 which passes right through the central piston pin 210 in the longitudinal direction thereof.

The piston screw tunnel 256, in this case, forms a lubricating-cooling gallery 227, the lubricating and cooling oil 283 being able in particular to flow between the piston screw body 255 and the inner wall of said tunnel 256, the latter forming with said body 255 a first section of the lubricating-cooling gallery 227 which extends from the piston cooling and lubricating chamber 217 to the internal piston volume 228, and a second section of said gallery 227 which extends from said volume 228 inside the transmission casing 206.

Advantageously, the piston screw body 255 comprises screw sealing bulges 258 which sealingly separate the piston screw tunnel 256 into two sections by means of bulge seals 259.

As shown clearly in FIGS. 2 to 5 and in FIGS. 8, 9, and 13, the axial double-acting piston screw 219 also comprises a piston screw head 253 that bears against the end of the upper piston rod 212 which faces the piston cooling and lubricating chamber 217, and a piston screw thread 254 which is screwed into the crosshead 244.

It will be assumed in this case that the working gas 240 is introduced into the expansion valve 279 via an intake valve 284 at a temperature of one thousand three hundred degrees Celsius, while the operating equilibrium temperature of the lower cylinder head 213 and of the upper cylinder head 214, which clamp the cooled cylinder casing 203, on the one hand, and that of the lower hot crown 226 and of the upper hot crown 232, which cover the multi-temperature double-acting piston 201, on the other hand, is of nine hundred and fifty degrees Celsius.

It is noted that, advantageously and as illustrated in FIGS. 1 and 2 and in FIGS. 6 and 7, the intake valve 284 and an exhaust valve 285 through which the working gas 240 is expelled from the expansion valve 279 after having been expanded therein are autoclaved, and can each be controlled by a regenerative valve hydraulic actuator as described in patent No. 3071896 dated Oct. 11, 2019 and belonging to the applicant.

Unlike the heat engine with transfer-expansion and regeneration according to patent WO2016120560, all the inner walls of the expansion valve of which are maintained at a high temperature of, for example, nine hundred and fifty degrees Celsius, the inner wall of the cold cylinder 204 of the expansion valve 279 of the heat engine 202 is in this case maintained by casing cylinder cooling means 286 at the relatively low temperature of one hundred degrees Celsius, this temperature being given only by way of example.

FIGS. 2 and 3 show that the casing cylinder cooling means 286 can consist of a cooling chamber 287 which envelops the outer surface of the cold cylinder 204, with a heat transfer liquid 288, in this case water, circulating in said chamber 287.

Thus, and as is clearly shown in FIGS. 2 and 3, practically all the inner walls of the expansion valve 279 of the heat engine 202 remain hot, like those of the transfer-expansion and regeneration heat engine according to patent WO2016120560, with the exception of the cold cylinder 204.

The remaining hot surfaces are sufficient to obtain from the regenerative Brayton cycle a thermodynamic efficiency significantly higher in practice than that obtained from the Otto and Diesel cycles.

It is noted, which is clearly shown in FIGS. 10 and 11, that the peripheral sealing ring 220 has a barrel skirt 260, two compression segments 222 and an oil scraper segment 278, these components 260, 222, 278 also being maintained at a temperature of around one hundred degrees Celsius, close to that of the cold cylinder 204 with which they engage, in particular in order to preserve the integrity of the lubricating and cooling oil 283 which forms a film on the inner wall of said cylinder 204.

It will therefore be understood that, unlike the transfer-expansion and regeneration heat engine of patent WO2016120560, the piston sealing means 221 are no longer constituted in this case by a fluid cushion sealing device of patent FR 3032252, but rather by sealing segments comparable to those of conventional automotive internal combustion engines, said means 221 being cooled and lubricated in the same way.

This similarity enables the multi-temperature double-acting piston 201 according to the invention to benefit from knowledge which is more than one hundred years old in the field of segmenting the pistons of internal combustion engines.

The particular configuration of said piston 201 and of the expansion valve 279 of which said piston 201 forms part is justified in that, under the temperature conditions that have just been described, the heat given up to the cold cylinder 204 by the working gas 240 forms an energy loss comparable or even less than that induced, on the one hand, by the fluid cushion sealing device which is the subject matter of patent FR 3032252 because of the compression means necessary for its supply with compressed air, and, on the other hand, by the regenerative cooling system according to patent No. EP 3585993 due to the additional pressure losses at the exhaust that it generates, and because of the reintroduction into the thermodynamic cycle of the heat extracted from the inner walls of the expansion valve via a regenerative heat exchanger, the efficiency of which is less than one.

As proof of the validity of the multi-temperature double-acting piston 201 according to the invention, it is noted that if all the inner walls of the expansion valve 279 shown in FIGS. 2 and 3—including the lower cylinder head 213, the upper cylinder head 214, the lower hot crown 226 and the upper hot crown 232—were maintained at only one hundred degrees Celsius, like the inner walls of automotive internal combustion engines produced in large series, the average surface-specific heat output—for example expressed in kilowatts per square meter—delivered by the working gas 240 to the cold cylinder 204 would be much lower than that delivered by said gas 240 to said cylinder heads 213, 214 and to said crowns 226, 232.

Indeed, the surface that the cold cylinder 204 exposes to the working gas 240 is small at the beginning of expansion of said gas 240, then increases as said gas 240 expands and as its temperature decreases, in contrast to the lower cylinder head 213, the upper cylinder head 214, the lower hot crown 226 and the upper hot crown 232, the surface of which exposed to the working gas 240 remains constant.

Thus, assuming that said cylinder heads 213, 214 and said crowns 226, 232 are voluntarily maintained at one hundred degrees Celsius during expansion, the specific cooling power at the surface would be much lower at the inner walls of the cold cylinder 204 than at those of said cylinder heads 213, 214 and of said crowns 226, 232.

Furthermore, since the multi-temperature double-acting piston 201 is, as its name indicates, double-acting, the surface area of the cold cylinder 204 relative to that of said cylinder heads 213, 214 and of said crowns 226, 232 is greatly reduced compared with what said surface area would be if said piston 201 were single-acting.

Indeed, since the cold cylinder 204 is common to the lower variable volume chamber 208 and to the upper variable volume chamber 209, its surface area in this case and in the embodiment of the multi-temperature double-acting piston 201 according to the invention shown in FIGS. 2 and 3 is less than thirty percent of the total internal surface area of the expansion valve 279 which is put into contact with the working gas 240.

It is also observed that at identical maximum power, the heat engine 202 being provided with the multi-temperature double-acting piston 201 and executing a regenerative Brayton cycle, the internal surface of its cold cylinder 204 is smaller in absolute terms than the internal surface of the cylinder of an Otto or Diesel cycle engine of conventional architecture.

This reduces the relative heat losses attributable to said cold cylinder 204.

In addition, the maximum temperature reached by the gases in the cylinder of a conventional Otto or Diesel cycle engine is around two thousand five hundred degrees Celsius compared with only about one thousand three hundred degrees Celsius for the heat engine 202 executing a regenerative Brayton cycle shown in FIGS. 1 to 3.

All other things being equal, this lower temperature further reduces the heat losses of the working gas 240 in contact with the cold cylinder 204.

Furthermore, it will be noted that unlike the lower cylinder head 213, the upper cylinder head 214, the lower hot crown 226 and the upper hot crown 232, the heat engine 202 being provided with the multi-temperature double-acting piston 201 according to the invention, its cold cylinder 204 is located in a zone of low turbulence of the working gas 240 during the introduction of said gas 240 into the lower variable volume chamber 208 or the upper variable volume chamber 209 via the corresponding intake valve 284, or during the expulsion of said gas 240 from said chambers 208, 209 via their exhaust valve 285.

This low-intensity turbulence limits convective forcing and heat transfer by the working gas 240 to the cold cylinder 204.

It will also be noted that, unlike conventional Otto or Diesel cycle engines, the turbulence of the gases introduced into the expansion valve 279 does not need to be forced by movements which are known to a person skilled in the art as “tumble”, “swirl”, or “squish”, in order to promote any combustion whatsoever.

Indeed, insofar as the heat engine 202 equipped with the multi-temperature double-acting piston 201 according to the invention executes a regenerative Brayton cycle—which is its primary purpose—the combustion or heating of the working gas 240 is carried out by means of a hot source located upstream of the expansion valve 279 and not in said expansion valve 279, said source possibly consisting of a burner, a heat exchanger or, by way of non-limiting example, a solar radiation concentration sensor.

The absence of the need to create voluntary turbulence in order to promote combustion therefore further reduces the heat losses of the heat engine 202 provided with the multi-temperature double-acting piston 201 according to the invention performing a regenerative Brayton cycle relative to those of a conventional Otto or Diesel cycle engine, due to less convective forcing between the working gas 240 and the inner wall of the cold cylinder 204.

This being explained, in order to benefit from the advantages of the multi-temperature double-acting piston 201 according to the invention, it will be understood that said piston 201 involves causing hot parts and cold parts which are only a few millimeters apart to engage.

In order to demonstrate how the multi-temperature double-acting piston 201 according to the invention enables hot parts to engage with cold parts which are very close to one another, it will be assumed in this case that the central piston pin 210, the lower radial connecting disk 224, the upper radial connecting disk 225, the peripheral sealing ring 220, as well as the lower outer coaxial pin tube 243 and the upper outer coaxial pin tube 248 are made of steel having high mechanical features, while the lower hot crown 226 and the upper hot crown 232 are made of silicon carbide 276.

The cooled cylinder casing 203 and the cold cylinder 204 are made of cast iron, while the lower cylinder head 213 and the upper cylinder head 214 are also made of silicon carbide 276.

It will also be assumed in this case that the inner diameter of the cold cylinder 204 is equal to two hundred and forty millimeters.

The great proximity between the cold parts 210, 224, 225, 220 made of steel or those made of cast iron 203, 204, and the hot parts 226, 232, reveals a double challenge related to the differential expansions and to the limitation of the heat transfers from said hot parts 226, 232, to said cold parts 210, 224, 225, 220, 203, 204.

Consider, for example, the case of the lower hot crown 226 of the multi-temperature double-acting piston 201 according to the invention, according to its particular configuration shown in FIGS. 2 to 4, in FIGS. 6 to 11, and in FIG. 13, the operation of the upper hot crown 232 being identical.

Said crown 226 and the mechanically welded assembly 289 formed by the peripheral sealing ring 220, the lower radial connecting disk 224, the upper radial connecting disk 225, and the central piston pin 210 with which said crown 226 engages are both manufactured at a temperature of about twenty degrees Celsius.

Yet, in operation, the temperature of the mechanically welded assembly 289 stabilizes at about one hundred degrees Celsius, while that of the lower hot crown 226 stabilizes at nine hundred and fifty degrees Celsius.

Taking into account the expansion coefficients of the constituent materials of the lower hot crown 226 and of the mechanically welded assembly 289, these temperatures lead to differences in hot diameter between that of said crown 226 and that of said assembly 289 of almost one millimeter.

Likewise, under the effect of temperature, the total axial length of the lower hot crown 226 also increases by about one millimeter, such a variation in said length being difficult to absorb by the crown applying means 234 which must also take up the axial forces generated by the inertia of said crown 226 during accelerations of the multi-temperature double-acting piston 201 according to the invention.

Furthermore, the great proximity between the lower hot crown 226 and the mechanically welded assembly 289 is such as to promote heat transfers from said crown 226 to said assembly 289, said transfers being detrimental to the thermodynamic efficiency of the regenerative Brayton cycle heat engine 202.

The multi-temperature double-acting piston 201 according to the invention serves, on the one hand, to absorb large differences in expansion between various parts which are held in contact with each other and which operate at very different temperatures and, on the other hand, to limit heat exchange between said parts.

As can be seen, for example, in FIG. 5, said piston 201 indeed comprises, on the one hand, an insulating ring 236 made of zirconium oxide 238 or of quartz—materials which are known to withstand temperatures well and to have very low thermal conductivity—between the lower hot crown 226 and the peripheral sealing ring 220 and, on the other hand, an insulating ring 236 made of the same material which is interposed between said crown 226 and the central piston pin 210.

As can be seen in FIG. 6, advantageously, the lower outer coaxial tube of the pin 243 that forms the crown applying means 234 rests on the insulating ring 236 which is radially close to the central piston pin 210.

FIG. 6 also shows the tube spring 250 which bears against the crosshead 244 and which consists of a stack of "Belleville" spring washers.

It is also noted that in order to limit heat losses which are detrimental to the efficiency of the regenerative Brayton cycle heat engine 202 which receives the multi-temperature double-acting piston 201 according to the invention, the insulating ring 236 interposed between the lower hot crown 226 and the peripheral sealing ring 220 is held applied against said crown 226 by means of a contact edge 241 of small surface area, thereby reducing the section left for the passage of heat.

As can be seen in FIGS. 10 and 11, by virtue of the particular configuration of the multi-temperature double-acting piston 201 according to the invention, the thermal expansion of the lower hot crown 226 has little or no effect on the total length of the assembly constituted by said crown 226 with the peripheral sealing ring 220, such that the crown applying means 234 that apply said crown 226 against said ring 220 are not overstressed by said expansion.

Indeed, it can be seen in FIGS. 10 and 11 that the lower hot crown 226 has a concave conical crown surface 251 by means of which said crown 226 is held applied by the crown applying means 234 against a circular peripheral contact edge 252 of the insulating ring 236, which is secured to the peripheral sealing ring 220, said edge 252 acting as a contact edge 241 with a small surface area.

The angle of the concave cone formed by the concave conical crown surface 251 is calculated such that when said surface 251 slides on the circular peripheral contact edge 252 due to the difference between the thermal expansion of the lower hot crown 226 and that of the mechanically welded assembly 289, the axial distance which separates the bearing point of the lower outer coaxial pin tube 243 on said crown 226 from the peripheral sealing ring 220 remains approximately constant, all else being equal.

According to this particular configuration of the multi-temperature double-acting piston 201 according to the invention, the concave conical crown surface 251 and the circular peripheral contact edge 252 of the insulating ring 236 which is secured to the peripheral sealing ring 220 form the crown centering means 235.

According to said configuration, the axial force to which the lower outer coaxial pin tube 243 is subjected remains approximately constant regardless of the difference between the thermal expansion of the lower hot crown 226 and that of the mechanically welded assembly 289, while said crown 226 always remains radially centered relative to the peripheral sealing ring 220.

It is also noted that said configuration also makes it possible to limit the variation in the volumetric ratio of the heat engine 202 as a function of its temperature, in particular during cold start phases of said engine 202.

It will be noted, for example in FIG. 6, that the insulating ring 236 which is interposed between the lower hot crown 226 and the lower outer coaxial pin tube 243 does not comprise, strictly speaking, a contact edge 241 with a small surface area, the radial thickness of said tube 243 constituting in itself said edge 241.

As clearly shown in FIGS. 4 and 5 and in FIGS. 8, 11 and 13, a barrel skirt 260 is therefore well arranged at the outer periphery of the peripheral sealing ring 220 so as to bear on the cold cylinder 204, said skirt 260 having a convergent shape which promotes the establishment of a hydrodynamic lubricating regime between itself and said cylinder 204.

In the vicinity of the two axial ends of the peripheral sealing ring 220, the two compression segments 222 that form the piston sealing means 221 and that prevent the working gas 240 from passing from the lower variable-volume chamber 208 to the upper variable-volume chamber 209, and vice versa, can be seen particularly clearly in FIGS. 10 and 11.

Still in FIGS. 10 and 11, below the barrel skirt 260, there can be seen the oil scraper segment 278 and the peripheral ring lubricating orifices 229 which open out at the rear of said segment 278.

This arrangement makes it possible, on the one hand, to supply lubricating and cooling oil 283 for lubricating the barrel skirt 260 and the compression segments 222, and, on the other hand, to return any excess of said oil 283 into the internal piston volume 228.

FIGS. 8 and 9 show the path of the lubricating and cooling oil 283 through the mechanically welded assembly 289.

Indeed, said oil 283 coming from a source of lubricating-cooling fluid 218 is in this case injected into the piston cooling and lubricating chamber 217 by a fluid nozzle 266, the latter projecting a jet of lubricating and cooling oil 283 into an axial screw reservoir 267 which is arranged axially in the piston screw head 253.

The axial screw reservoir 267 makes it possible to store lubricating and cooling oil 283 whatever the direction of movement of the multi-temperature double-acting piston 201 according to the invention, and to maximize the part of said oil 283 which passes through the internal piston volume 228 before being expelled into the transmission casing 206.

Indeed, a relatively small amount of said oil 283 is used, on the one hand, to lubricate the cut segments 282 or the extensible continuous ring 297 that form a sealing between the upper outer coaxial pin tube 248 and the upper cylinder head 214 and, on the other hand, to cool said tube 248.

In this respect, FIG. 12 shows the pressure-limiting valve 274 which acts as an overflow of the piston cooling and lubricating chamber 217 and which makes it possible, in engagement with an air intake check valve 271 connected to an air source 270, for said valve 271 to allow fluid forcing air 272 to enter said chamber 217, to slightly pressurize the latter while limiting the level of lubricating and cooling oil 283 contained in said chamber 217.

Indeed, below a certain pressure prevailing in the piston cooling and lubricating chamber 217, the air intake check valve 271 lets in fluid forcing air 272 from the air source 270 into said chamber 217, while above a certain said pressure, the pressure-limiting valve 274 expels fluid forcing air 272 into an air tarpaulin 273.

As can be seen in FIG. 12, advantageously, the inside of the transmission casing 206 can form both the air source 270 and the air tarpaulin 273.

The slight pressurization of the piston cooling and lubricating chamber 217 by means of a fluid forcing air 272 makes it possible, when the heat engine 202 is running at low speed and the accelerations of the multi-temperature double-acting piston 201 according to the invention are of low intensity, to force the lubricating and cooling oil 283 to penetrate into the lubricating-cooling gallery 227 which is arranged in the central piston pin 210.

Still for the purpose of maximizing the portion of lubricating and cooling oil 283 that passes through the internal piston volume 228, FIGS. 7, 8, 9, and 13 show the screw check valve 269 which is in this case positioned at the bottom of the axial screw reservoir 267 such that at each acceleration towards the upper cylinder head 214 of the multi-temperature double-acting piston 201 according to the invention, the lubricating and cooling oil 283 contained in said reservoir 267 is forced to penetrate into the lubricating-cooling gallery 227 via radial reservoir-gallery connection ducts 268, while when said piston 201 accelerates towards the lower cylinder head 213, said oil 283 contained in said gallery 227 does not return to said reservoir 267.

All of these arrangements made at the piston cooling and lubricating chamber 217 and at the piston screw head 253 ensure circulation of lubricating and cooling oil 283 inside the mechanically welded assembly 289 in order to maintain the temperature of the latter at about one hundred degrees Celsius, while ensuring that the barrel skirt 260 and the segments 222, 278 are suitably lubricated.

As can be seen in FIGS. 8, 9, and 13, a first section of the lubricating-cooling gallery 227 conveys the lubricating and cooling oil 283 from the piston cooling and lubricating chamber 217 to the internal piston volume 228, first passing through the axial screw reservoir 267, the screw check valve 269, and the radial reservoir-gallery connection ducts 268.

In FIGS. 8 and 9, it has been shown that the lubricating and cooling oil 283 opens out into the internal piston volume 228 via a small axial clearance which is left between a fluid distribution disk 261 and the upper radial connecting disk 225, said distribution disk 261 being mainly parallel to said radial connecting disk 225 and, on the one hand, forming a sealing with the central piston pin 210 and ending, on the other hand, radially in the vicinity of the inner wall of the peripheral sealing ring 220, with the lubricating and cooling oil 283 coming from the piston cooling and lubricating chamber 217 being able to leave in said vicinity via distribution weirs 290.

The axial proximity between the fluid distribution disk 261 and the upper radial connecting disk 225 is such that the lubricating and cooling oil 283 is forced to lick the entire internal surface of the upper radial connecting disk 225 before exiting through the distribution weirs 290.

This particular configuration of the multi-temperature double-acting piston 201 according to the invention makes it possible to maintain the temperature of the upper radial connecting disk 225 close to one hundred degrees Celsius, whatever the power delivered by the heat engine 202.

It is moreover noted in FIG. 13 that in order to limit the heat received by the lower radial connecting disk 224 and by the upper radial connecting disk 225, a reflecting screen 295 can advantageously be interposed between the lower hot crown 226 and the lower radial connecting disk 224 and between the upper hot crown 232 and the upper radial connecting disk 225, said reflecting screen 295 returning to the lower hot crown 226 and/or to the upper hot crown 232 the heat that emits, in particular in the form of infrared radiation, said crown 226, 232.

FIG. 13 illustrates that, in addition to the reflecting screen 295, a honeycomb or fibrous insulating material 296 can occupy all or part of the space between the lower hot crown 226 and the lower radial connecting disk 224 and between the upper hot crown 232 and the upper radial connecting disk 225.

As can be seen in FIG. 8, some of the lubricating and cooling oil 283 leaving the distribution weirs 290 cools the peripheral sealing ring 220 from the inside and feeds the peripheral ring lubricating orifices 229, such that a little of said oil 283 leaves between the two lips of the oil scraper segment 278, the latter forming, following the reciprocal movements made by the multi-temperature double-acting piston 201 in the cold cylinder 204, a lubricating and cooling oil film 283 on the surface of said cylinder 204, while recovering said oil 283 present in excess on said surface.

It is noted in FIGS. 8 and 9 that the acceleration forces are used by the multi-temperature double-acting piston 201 according to the invention to force the lubricating and cooling oil 283 to travel such that all the surfaces of the internal piston volume 228 are uniformly cooled.

In this respect, FIGS. 8 and 9 show the fluid recirculation collar 262 of the central piston pin 210, inside the internal piston volume 228 and in the vicinity of the lower radial connecting disk 224.

At each acceleration towards the lower cylinder head 213 of the multi-temperature double-acting piston 201 according to the invention and as illustrated in FIG. 9, said collar 262 rejects, radially and towards the inner wall of the peripheral sealing ring 220, the lubricating and cooling oil 283 which has accumulated in an overflow reservoir 264 consisting of a hollow shape which the lower radial connecting disk 224 has at its connection with the central piston pin 210.

As shown in FIGS. 4 to 11, the fluid recirculation collar 262 can advantageously comprise collar channels 263 that form radial jets of lubricating-cooling fluid 257 so as to guarantee that the lubricating and cooling oil 283 is uniformly distributed over three hundred and sixty degrees.

FIGS. 8 and 9 show the overflow orifices 265 that open out from the outer wall of the central piston pin 210 and that communicate with the inside of the transmission casing 206 via the lubricating-cooling gallery 227.

The axial position of said orifices 265 set the maximum level of said reservoir 264 such that at each acceleration towards the upper cylinder head 214 of the multi-temperature double-acting piston 201 according to the invention, the level of lubricating and cooling oil 283 contained in said reservoir 264 does not exceed that of said overflow orifices 265, said excess oil 283 being expelled towards the inside of the transmission casing 206.

The possibilities of the multi-temperature double-acting piston 1 according to the invention are not limited to the applications which have just been described and it must moreover be understood that the above description has been given by way of example only and that it in no way limits the field of the said invention from which it would not be possible to depart by replacing the details of execution described by any other equivalent.

The invention claimed is:

1. A multi-temperature double-acting piston being able to move in translation in a cold cylinder arranged in a cooled cylinder casing which comprises a heat engine, said piston being directly or indirectly connected by power transmission means housed in a transmission casing to at least one rotary or reciprocating power output shaft while said piston forms a lower variable volume chamber with the cold cylinder and a lower cylinder head which is positioned between said piston and the transmission housing, said piston simultaneously forming an upper variable volume chamber with said cylinder and an upper cylinder head, said chambers containing a working gas, comprising

- a central piston pin which is approximately coaxial with the cold cylinder and that has a first end that forms a lower piston rod which passes right through the lower cylinder head via a lower rod orifice that engages with lower rod sealing means so as to open out into the transmission casing and so as to be connected directly or indirectly to the power transmission means by means of piston fixing means, while the second end of said pin forms a upper piston rod which passes right through the upper cylinder head via an upper rod orifice which engages with upper rod sealing means so as to open out into a piston cooling and lubricating chamber connected to a source of lubricating-cooling fluid, the source of lubricating-cooling fluid introducing a lubricating-cooling fluid into said chamber;

a peripheral sealing ring the outer diameter of which is substantially smaller than the inner diameter of the cold cylinder, said ring comprising piston sealing means which are in contact with said cylinder to provide sealing therewith;

a lower radial connecting disk which radially connects the central piston pin with the peripheral sealing ring on the lower variable volume chamber side, and an upper radial connecting disk which radially connects the central piston pin with the peripheral sealing ring on the upper variable volume chamber side, the space left between said disks, the peripheral sealing ring and the central piston pin forming an internal piston volume;

a lubricating-cooling gallery arranged mainly axially in the central piston pin and in one or more sections, said gallery putting the piston cooling and lubricating chamber into communication with both the internal piston volume, and also said volume with the inside of the transmission casing;

at least one peripheral ring lubricating orifice which puts the internal piston volume into communication with the outer peripheral face of the peripheral sealing ring, said orifice opening axially from said face between at least two piston sealing means;

guide means which directly or indirectly bear on or in the vicinity of the power transmission means and/or the cold cylinder and/or the lower cylinder head and/or the upper cylinder head, said means directly or indirectly maintaining the peripheral sealing ring centered in the cold cylinder;

a lower hot crown interposed between the lower radial connecting disk and the lower variable volume chamber and/or an upper hot crown interposed between the upper radial connecting disk and the upper variable volume chamber;

crown applying means which directly or indirectly hold the lower hot crown applied against the peripheral sealing ring and/or against the lower radial connecting disk, and/or which directly or indirectly hold the upper hot crown applied against said ring and/or against the upper radial connecting disk, said means leaving said crowns free to expand relative to said ring and/or to said disks;

crown centering means which locate the lower hot crown and/or the upper hot crown relative to the peripheral sealing ring.

2. The multi-temperature double-acting piston according to claim 1, wherein the lower hot crown and/or the upper hot crown are entirely or partly made of a high-temperature-resistant material.

3. The multi-temperature double acting piston according to claim 2, wherein the high-temperature resistant material mainly consists of silicon carbide.

4. The multi-temperature double-acting piston according to claim 1, wherein thermal insulation means and/or crown sealing means are interposed either between the lower hot crown and the peripheral sealing ring and/or the lower radial connection disk, or between the upper hot crown and the said ring and/or the upper radial connection disk, or both.

5. The multi-temperature double-acting piston according to claim 1, wherein thermal insulation means and/or crown sealing means are interposed either between the lower hot crown and the central piston pin, or between the upper hot crown and said pin, or both.

6. The multi-temperature double-acting piston according to claim 4, wherein the thermal insulation means consist of at least one insulating ring made of a low thermal conductivity material.

7. The multi-temperature double-acting piston according to claim 6, wherein the low thermal conductivity material mainly consists of zirconium oxide.

8. The multi-temperature double-acting piston according to claim 6, wherein the insulating ring is held directly or indirectly in contact with the central piston pin and/or the peripheral sealing ring and/or the lower hot crown and/or the lower radial connecting disk and/or the upper hot crown and/or the upper radial connecting disk by means of at least one small-surface area contact edge.

9. The multi-temperature double-acting piston according to claim 6, wherein the insulating ring is held directly or indirectly in contact with the central piston pin and/or the peripheral sealing ring and/or the lower hot crown and/or the lower radial connecting disk and/or the upper hot crown and/or the upper radial connecting disk by means of at least one insulating sealing gasket which is sealed against the working gas.

10. The multi-temperature double-acting piston according to claim 1, wherein the crown applying means which directly or indirectly hold the lower hot crown applied against the peripheral sealing ring and/or the lower radial connecting disk are formed by an lower outer coaxial pin tube which envelops the central piston pin, said tube bearing both against the lower hot crown in the vicinity of said pin, and also against the power transmission means.

11. The multi-temperature double-acting piston according to claim 1, wherein the crown applying means that directly or indirectly hold the upper hot crown applied against the peripheral sealing ring and/or the upper radial connecting disk consist of an upper outer coaxial pin tube that envelops the central piston pin, said tube bearing both against the upper hot crown in the vicinity of said pin and also against an upper rod abutment which is provided directly or indirectly against the upper piston rod in the vicinity of the end that opens out into the piston cooling and lubricating chamber.

12. The multi-temperature double-acting piston according to claim 10, wherein some or all of the ends of the lower outer coaxial pin tube receive a tube spring by means of which said tube bears against the lower hot crown and against the power transmission means.

13. The multi-temperature double-acting piston according to claim 1, wherein the lower hot crown and/or the upper hot crown has a concave conical crown surface by means of which said crown is held applied by the crown applying means against a circular peripheral contact edge which is directly or indirectly secured to the peripheral sealing ring and/or the periphery of the lower radial connecting disk and/or the periphery of the upper radial connecting disk, the angle of the concave cone formed by said surface being such that when said surface slides on said edge due to the difference between the thermal expansion of said crown and that of the assembly formed by the peripheral sealing ring, the lower radial connecting disk, the upper radial connecting disk and the central piston pin, the axial distance which separates the bearing point of the crown applying means on said crown of the peripheral sealing ring remains approximately constant, all else being equal, while the crown concave conical surface and the circular peripheral contact edge form the crown centering means.

14. The multi-temperature double-acting piston according to claim 1, wherein the piston fixing means consist of a double-acting axial piston screw that comprises, on the one hand, a piston screw body which is housed in a piston screw tunnel which passes right through the central piston pin in the longitudinal direction thereof, said screw comprising both a piston screw head which bears against the end of the upper piston rod which opens out into the piston cooling and lubricating chamber and also a piston screw thread which is screwed into the power transmission means.

15. The multi-temperature double-acting piston according to claim 14, wherein the piston screw tunnel forms at least a part of the lubricating-cooling gallery, the lubricating-cooling fluid being able to circulate between the piston screw body and the inner wall of said tunnel, the inner wall of said tunnel forming with said body a first section which extends from the piston cooling and lubricating chamber to the internal piston volume, and a second section which extends from said volume inside the transmission casing.

16. The multi-temperature double-acting piston according to claim 1, wherein the guide means consist of a barrel skirt which is arranged on the outer periphery of the peripheral sealing ring and that bears against the cold cylinder.

17. The multi-temperature double-acting piston according to claim 1, wherein the lubricating-cooling gallery opens out into the internal piston volume via a small axial clearance left between both a fluid distribution disk which is housed in said volume, and also the upper radial connecting disk, said distribution disk being approximately parallel to said radial connecting disk and forming both a sealing with the central piston pin, and also ending radially in the vicinity of the inner wall of the peripheral sealing ring, the lubricating-cooling fluid coming from the piston cooling and lubricating chamber being able to leave in said vicinity.

18. The multi-temperature double-acting piston according to claim 1, wherein the central piston pin comprises, inside the internal piston volume and in the vicinity of the lower radial connecting disk, a fluid recirculation collar which, when the central piston pin moves towards the lower cylinder head, rejects the lubricant-cooling fluid that has accumulated in said volume and at the surface of said disk radially and towards the inner wall of the peripheral sealing ring.

19. The multi-temperature double-acting piston according to claim 1, wherein the lower radial connecting disk has a hollow shape at the connection with the central piston pin, said shape constituting an overflow reservoir which can store lubricant-cooling fluid, while at least one overflow orifice which communicates with the inside of the transmission housing via the lubricant-cooling gallery sets the maximum level of said reservoir.

20. The multi-temperature double-acting piston according to claim 1, wherein a fluid nozzle fed by the lubricating-cooling fluid source opens into the piston cooling and lubricating chamber for injecting a fluid jet therein.

21. The multi-temperature double-acting piston according to claim 14, wherein a fluid nozzle fed by the lubricating-cooling fluid source opens into the piston cooling and lubricating chamber for injecting a fluid jet therein, and wherein the fluid nozzle injects a jet of lubricating-cooling fluid into an axial screw reservoir which is arranged axially in the piston screw head, said reservoir communicating with the lubricating-cooling gallery via at least one radial reservoir-gallery connection duct.

22. The multi-temperature double-acting piston according to claim 21, wherein a screw check valve is housed in the double-acting piston axial screw, said valve allowing the lubricating-cooling fluid to go from the axial screw reservoir to the lubricating-cooling gallery, but not conversely.

23. The multi-temperature double-acting piston according to claim 1, wherein the piston cooling and lubricating chamber is connected to an air source by an air intake check valve that lets fluid forcing air into said chamber without letting the air leave, while said chamber is connected to an air tarpaulin by a pressure-limiting valve which lets fluid forcing air go from said chamber to said tarpaulin when the pressure of said air in said chamber reaches a certain value.

24. The multi-temperature double-acting piston according to claim 1, wherein a reflective shield is interposed between the lower hot crown and the lower radial connecting disk to which a part of the peripheral sealing ring can be added and/or between the upper hot crown and the upper radial connecting disk to which a part of said ring can be added.

25. The multi-temperature double-acting piston according to claim 4, wherein the thermal insulation means consist of a honeycomb or fibrous insulating material which occupies all or part of the space between the lower hot crown and the lower radial connecting disk and/or between the upper hot crown and the upper radial connecting disk.

26. The multi-temperature double-acting piston according to claim 14, wherein the crown applying means which directly or indirectly hold the lower hot crown applied against the peripheral sealing ring and/or the lower radial connecting disk are formed by an lower outer coaxial pin tube which envelops the central piston pin, said tube bearing both against the lower hot crown in the vicinity of said pin, and also against the power transmission means, wherein the crown applying means that directly or indirectly hold the upper hot crown applied against the peripheral sealing ring and/or the upper radial connecting disk consist of an upper outer coaxial pin tube that envelops the central piston pin, said tube bearing both against the upper hot crown in the vicinity of said pin and also against an upper rod abutment which is provided directly or indirectly against the upper piston rod in the vicinity of the end that opens out into the piston cooling and lubricating chamber, and wherein at least a first radial space left between the upper outer coaxial pin tube and the central piston pin, at least a second radial space left between the outer coaxial lower pin tube and the central piston pin, and a plurality of radial spaces left between the piston screw body and the inner wall of the piston screw tunnel form at least a part of the lubricating-cooling gallery, the lubricating-cooling fluid being able to circulate successively in said spaces from the piston cooling and lubricating chamber to the internal piston volume, then from said volume inside the transmission casing.

27. The multi-temperature double-acting piston according to claim 1, wherein the lower rod sealing means and/or the upper rod sealing means consist of an extensible continuous ring which is directly or indirectly secured to the cooled cylinder casing, and the inner diameter of which is substantially smaller than the outer diameter of the lower piston rod or the upper piston rod that it clamps.

28. The multi-temperature double-acting piston according to claim 27, wherein the extensible continuous ring is connected to a ring plate by a ring tube of small radial thickness, said ring, said plate and said ring being made of one single piece of material.

29. The multi-temperature double-acting piston according to claim 27, wherein the continuously extensible ring is axially clamped between two ring bushings by a ring axial compression spring.

* * * * *